United States Patent
Hasegawa et al.

(10) Patent No.: US 10,943,462 B2
(45) Date of Patent: Mar. 9, 2021

(54) METHOD AND ELECTRONIC DEVICE

(71) Applicant: NIKON CORPORATION, Tokyo (JP)

(72) Inventors: Satoshi Hasegawa, Yokohama (JP); Noriyasu Kotani, Tokyo (JP); Hisashi Tai, Kawasaki (JP); Terutada Akiyama, Okegawa (JP); Taichi Goto, Tokyo (JP); Hiroshi Kamehara, Yokohama (JP); Yu Murakoshi, Niiza (JP); Masakazu Sekiguchi, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/774,928

(22) PCT Filed: Nov. 21, 2013

(86) PCT No.: PCT/JP2013/081415
§ 371 (c)(1),
(2) Date: Oct. 23, 2015

(87) PCT Pub. No.: WO2014/141540
PCT Pub. Date: Sep. 18, 2014

(65) Prior Publication Data
US 2016/0063849 A1    Mar. 3, 2016

(30) Foreign Application Priority Data

Mar. 11, 2013  (JP) .............................. JP2013-047855
Mar. 11, 2013  (JP) .............................. JP2013-047856

(51) Int. Cl.
*G08B 21/24*    (2006.01)
*H04M 19/04*    (2006.01)
*H04W 4/02*    (2018.01)

(52) U.S. Cl.
CPC ............ *G08B 21/24* (2013.01); *H04M 19/04* (2013.01); *H04W 4/023* (2013.01)

(58) Field of Classification Search
CPC ....... G08B 21/24; H04W 4/023; H04M 19/04
See application file for complete search history.

(56) References Cited

U.S. PATENT DOCUMENTS 7,623,030 B1 * 11/2009 Popescu .................. G01S 11/02
340/539.1
7,898,414 B2 * 3/2011 Spano .................... G08B 21/24
340/539.13

(Continued)

FOREIGN PATENT DOCUMENTS

CN         1975620 A      6/2007
CN       101017597 A      8/2007

(Continued)

OTHER PUBLICATIONS

Dec. 13, 2016 Office Action issued in Japanese Patent Application No. 2013-047856.

(Continued)

*Primary Examiner* — Ryan W Sherwin
(74) *Attorney, Agent, or Firm* — Oliff PLC

(57) ABSTRACT

A method implemented by a computer, the method includes: detecting a position of an electronic device capable of communicating with a portable device; setting a range of a position at which the electronic device provides a notification pertaining to the portable device based on a position of the electronic device that has communicated with the portable device; and providing the notification based on the range set in the setting and the position of the electronic device detected in the detecting of a position.

17 Claims, 20 Drawing Sheets

(56) References Cited

U.S. PATENT DOCUMENTS

| | | | |
|---|---|---|---|
| 9,247,387 B2* | 1/2016 | Bonanni | H04W 4/023 |
| 2007/0164748 A1 | 7/2007 | Ishihara et al. | |
| 2009/0233735 A1 | 9/2009 | Savarese et al. | |
| 2010/0289646 A1* | 11/2010 | Raniere | G08B 13/14 340/572.1 |
| 2011/0148625 A1* | 6/2011 | Velusamy | G08B 13/1427 340/539.13 |
| 2011/0171937 A1* | 7/2011 | Hill | H04B 5/0031 455/412.2 |
| 2011/0283334 A1 | 11/2011 | Choi et al. | |
| 2012/0249330 A1 | 10/2012 | Savarese et al. | |
| 2012/0295510 A1 | 11/2012 | Boeckle | |
| 2013/0095939 A1 | 4/2013 | Meadows et al. | |
| 2013/0130719 A1* | 5/2013 | Busch | H04W 4/029 455/456.3 |
| 2013/0178162 A1* | 7/2013 | Neumeyer | H04R 25/554 455/41.2 |
| 2014/0221118 A1 | 8/2014 | Meadows et al. | |

FOREIGN PATENT DOCUMENTS

| | | |
|---|---|---|
| CN | 102244676 A | 11/2011 |
| CN | 202454037 U | 9/2012 |
| JP | 3017835 U | 11/1995 |
| JP | H10-267744 A | 10/1998 |
| JP | 2002-163301 A | 6/2002 |
| JP | 2002-344371 A | 11/2002 |
| JP | 2004-287713 A | 10/2004 |
| JP | 2004-349969 A | 12/2004 |
| JP | 2005-304002 A | 10/2005 |
| JP | 2006-223551 A | 8/2006 |
| JP | 2008-022492 A | 1/2008 |
| JP | 2008-301469 A | 12/2008 |
| JP | 2010-171911 A | 8/2010 |
| JP | 2011-520164 A | 7/2011 |
| WO | 2011/057194 A1 | 5/2011 |

OTHER PUBLICATIONS

Dec. 13, 2016 Office Action issued in Japanese Patent Application No. 2013-047855.
Ouch et al., "Living Activity Recognition Using an Accelerometer and a Microphone," Corporate Research & Development Center, Toshiba Corporation, 2011.
Jan. 7, 2014 International Search Report issued in International Patent Application No. PCT/JP2013/081415.
Nov. 3, 2016 Office Action issued in Chinese Patent Application No. 201380076544.
Jan. 22, 2019 Office Action issued in Japanese Patent Application No. 2018-010356.
Mar. 29, 2019 Office Action issued in Chinese Patent Application No. 201810200679.7.
Feb. 12, 2020 Office Action issued in Japanese Patent Application No. 2019-029073.
Jun. 30, 2020 Office Action issued in Japanese Patent Application No. 2019-029073.

* cited by examiner

FIG. 4

<PAIRING INFORMATION TABLE>

| ID NUMBER |
|---|
| A12345 |

FIG. 6

<PAIRING INFORMATION TABLE>

| ID NUMBER | COMMUNICATION DISCONNECTED POSITION | COMMUNICATION DISCONNECTED DATE AND TIME |
|---|---|---|
| A12345 | (35.68, 139.76) | 2013/2/15 19:00 |

FIG. 9A <DETERMINATION PROCESS> FIG. 9B
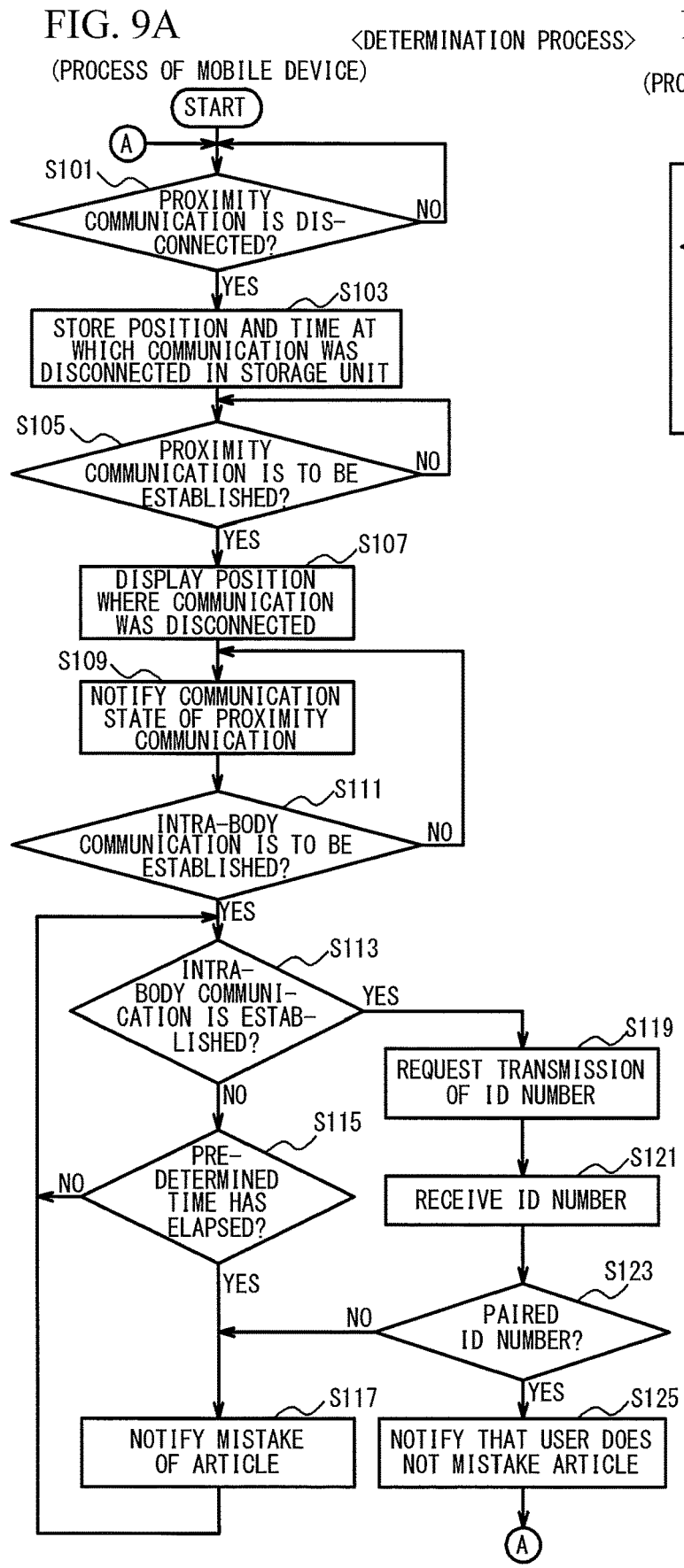
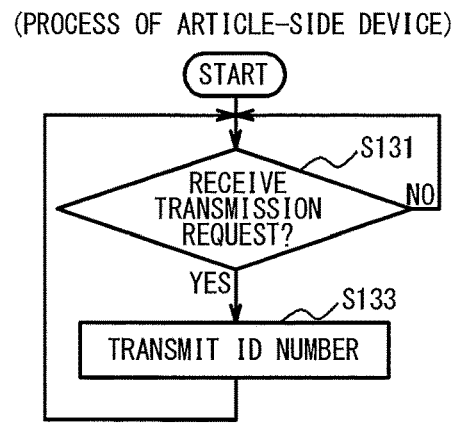

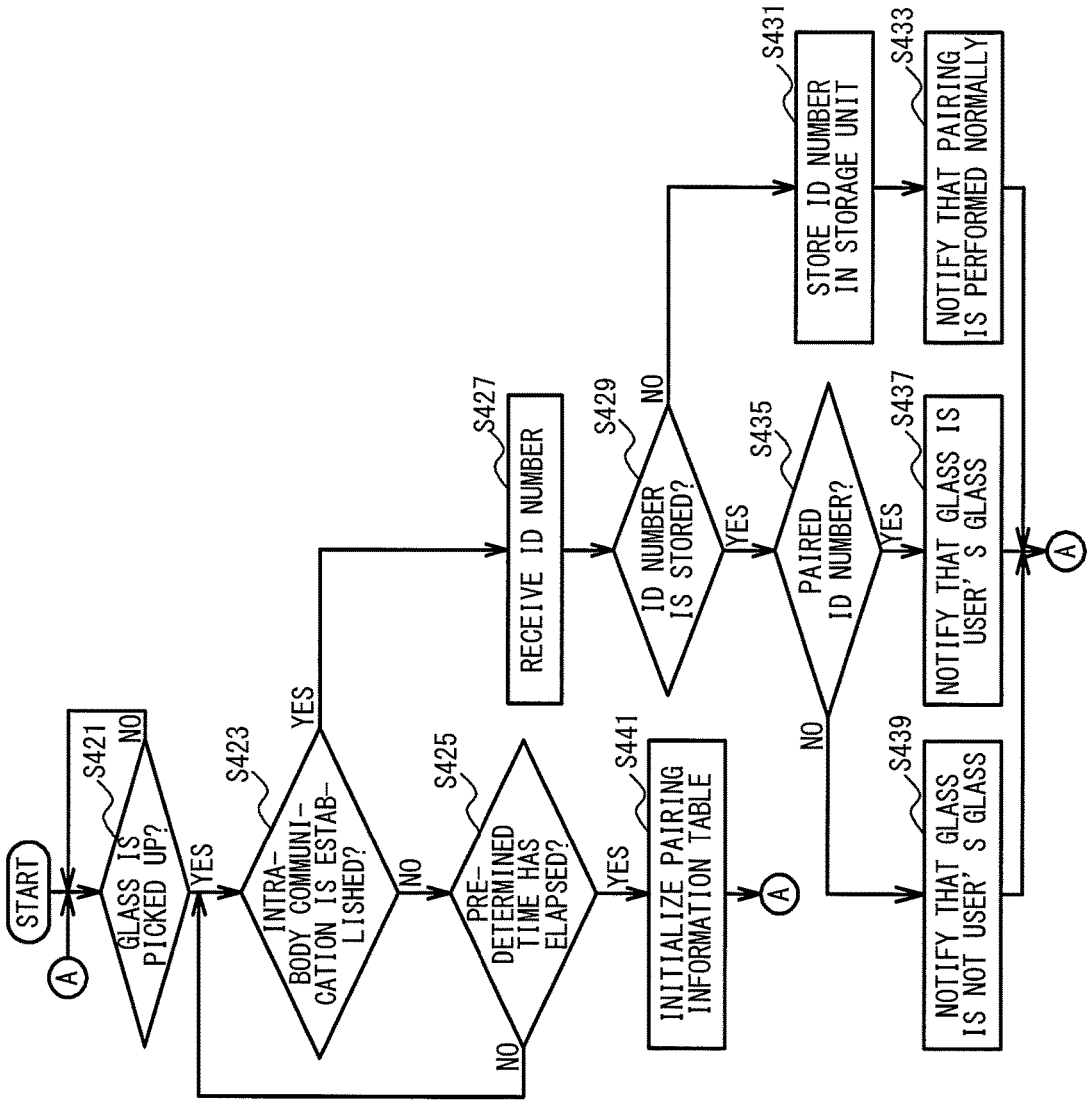
FIG. 12B (PROCESS OF ARTICLE-SIDE DEVICE)
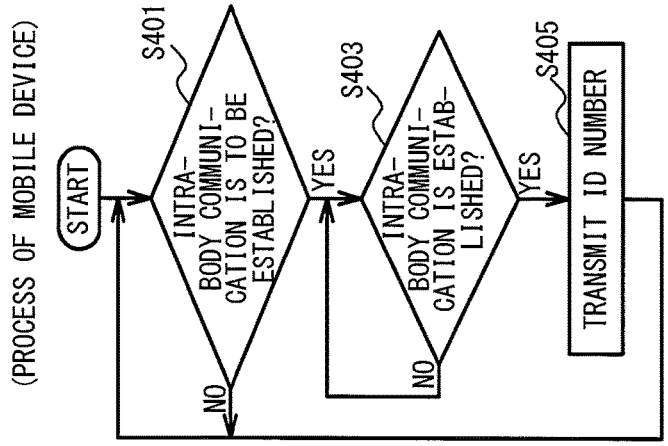
FIG. 12A (PROCESS OF MOBILE DEVICE)

FIG. 18A

<CLUB INFORMATION TABLE>

| OWNER | NUMBER | COMMUNICATION DISCONNECTED POSITION |
|---|---|---|
| USER A | SW | — |
| USER A | PW | — |

FIG. 18B

<CLUB INFORMATION TABLE>

| OWNER | NUMBER | COMMUNICATION DISCONNECTED POSITION |
|---|---|---|
| USER A | SW | — |
| USER A | PW | (36.36, 139.11) |

FIG. 18C

<CLUB INFORMATION TABLE FOR DETERMINATION>

| OWNER | NUMBER |
|---|---|
| USER A | SW |

FIG. 18D

<CLUB INFORMATION TABLE>

| OWNER | NUMBER | COMMUNICATION DISCONNECTED POSITION |
|---|---|---|
| USER A | SW | — |
| USER A | PW | (36.36, 139.11) |

⟷

<CLUB INFORMATION TABLE FOR DETERMINATION>

| OWNER | NUMBER |
|---|---|
| USER A | SW |
| USER B | PW |

FIG. 18E

<CLUB INFORMATION TABLE>

| OWNER | NUMBER | COMMUNICATION DISCONNECTED POSITION |
|---|---|---|
| USER A | SW | — |
| USER A | PW | (36.36, 139.11) |

⟷

<CLUB INFORMATION TABLE FOR DETERMINATION>

| OWNER | NUMBER |
|---|---|
| USER A | SW |
| USER A | PW |
| USER B | PW |

FIG. 18F

<CLUB INFORMATION TABLE>

| OWNER | NUMBER | COMMUNICATION DISCONNECTED POSITION |
|---|---|---|
| USER A | SW | — |
| USER A | PW | (36.36, 139.11) |

⟷

<CLUB INFORMATION TABLE FOR DETERMINATION>

| OWNER | NUMBER |
|---|---|
| USER A | SW |

US 10,943,462 B2

METHOD AND ELECTRONIC DEVICE

TECHNICAL FIELD

The present invention relates to a method and an electronic device.

BACKGROUND ART

There has been conventionally suggested technologies for preventing an article from being misplaced or being taken for someone else's article by mistake. For example, Patent Document 1 suggests a method of managing overage or shortage of clubs by attaching IC (Integrated Circuit) tags to golf clubs and using detection results of an IC tag detection unit located at a point passed by after the end of each hole. Moreover, for example, Patent Document 2 suggests a technique relating to a mark used to prevent a mistake of shoes.

PRIOR ART DOCUMENTS

Patent Documents

Patent Document 1: Japanese Patent Application Publication No. 2006-223551
Patent Document 2: Japanese Registered Utility Model No. 3017835

SUMMARY OF THE INVENTION

Problems to be Solved by the Invention

However, the method of Patent Document 1 limits the location capable of managing overage or shortage of clubs, and is not always user friendly because a player cannot know the place where a club was misplaced when the club was misplaced in the middle of the hole.

The technique disclosed in Patent Document 2 condemns a user to attach the mark to user's shoes, and thereby is not user friendly.

The present invention has been made in the view of above problems, and aims to provide a method and an electronic device capable of offering improved user convenience in preventing a user from misplacing an article or taking someone else's article by mistake.

MEANS FOR SOLVING THE PROBLEMS

The electronic device of the present invention includes: a communication unit that communicates with a first device through intra-body communication conducted via a user or through proximity communication; a detection unit that detects when communication between the communication unit and the first device is to be established; and a notification unit that, when the detection unit detects that the communication between the communication unit and the first device is to be established, provides a notification pertaining to the first device based on a communication state between the communication unit and the first device.

In this case, the notification unit may provide the notification in accordance with the communication state between the communication unit and the first device. In the electronic device of the present invention, the communication state between the communication unit and the first device may be determined based on a reception state of identification information of the first device.

Additionally, the electronic device of the present invention may include an action detection unit that detects an action of the user, wherein the detection unit may detect when the communication between the communication unit and the first device is to be established based on an action of the user detected by the action detection unit. Additionally, in the electronic device of the present invention, the detection unit may detect when the communication between the communication unit and the first device is to be established based on a contact state between a device capable of communicating with the communication unit and the user.

In addition, the electronic device of the present invention may include: a position detecting unit that detects positional information of the user, wherein the detection unit may detect when the communication between the communication unit and the first device is to be established based on the positional information of the user. Furthermore, in the electronic device of the present invention, the notification unit may notify a position where the communication between the communication unit and the first device was disconnected.

Additionally, one of the first device and the electronic device may be installed in an article used by the user, and another of the first device and the electronic device may be held by the user. Additionally, the electronic device may be a device wearable by the user.

Additionally, the electronic device of the present invention may include a registration unit that registers the first device in the electronic device. In this case, the registration unit may perform the registration while the user has the first device in user's hand.

The electronic device of the present invention includes: a communication unit that communicates with a first device and a second device different from the first device through intra-body communication conducted via a first user or through proximity communication; a detection unit that detects when communication between the communication unit and the first device and communication between the communication unit and the second device are to be established; and a notification unit that, when the detection unit detects that the communication between the communication unit and the first device and the communication between the communication unit and the second device are to be established, notifies the first user based on a communication state between the communication unit and the first device and a communication state between the communication unit and the second device.

In this case, the detection unit may detect when he communication between the communication unit and the first device and the communication between the communication unit and the second device are to be established based on at least one of positional information of the first user and moving information of the first user. Moreover, the detection unit may detect when communication between one of the first device and the second device and the communication unit is to be established based on whether the first user used another of the first device and the second device. Moreover, the detection unit may detect when communication between one of the first device and the second device and the communication unit is to be established based on whether the first user has moved a predetermined distance away from a position where communication between the communication unit and another of the first device and the second device was disconnected.

Moreover, in the electronic device of the present invention, the notification unit may provide the notification in accordance with a determination result of whether at least one of the first device and the second device is held by a second user different from the first user. Additionally, the electronic device of the present invention may include a prohibiting unit that prohibits notification by the notification unit when the first user does not move.

Additionally, in the electronic device of the present invention, when the detection unit detects when the communication between the communication unit and the first device and the communication between the communication unit and the second device are to be established based on at least one of the positional information of the first user and the moving information of the first user, the positional information of the first user and the moving information of the first user may be detected by a single sensor.

Effects of the Invention

The present invention provides a method and an electronic device capable of offering improved user convenience in preventing the user from misplacing an article or taking someone else's article by mistake.

BRIEF DESCRIPTION OF DRAWINGS

FIG. 4 illustrates a pairing information table;

FIG. 6 is a diagram for explaining the process of FIG. 5A;

FIG. 9A is a flowchart of an exemplary process executed by a mobile device in a determination process of the second embodiment, and FIG. 9B is a flowchart of an exemplary process executed by the article-side device;

FIG. 12A is a flowchart of an exemplary process executed by a mobile device of the third embodiment, and FIG. 12B is a flowchart of an exemplary process executed by the article-side device;

FIG. 18A through FIG. 18F are diagrams for explaining the processes of FIG. 16 and FIG. 17;

MODES FOR CARRYING OUT THE INVENTION

First Embodiment

Figure 1:
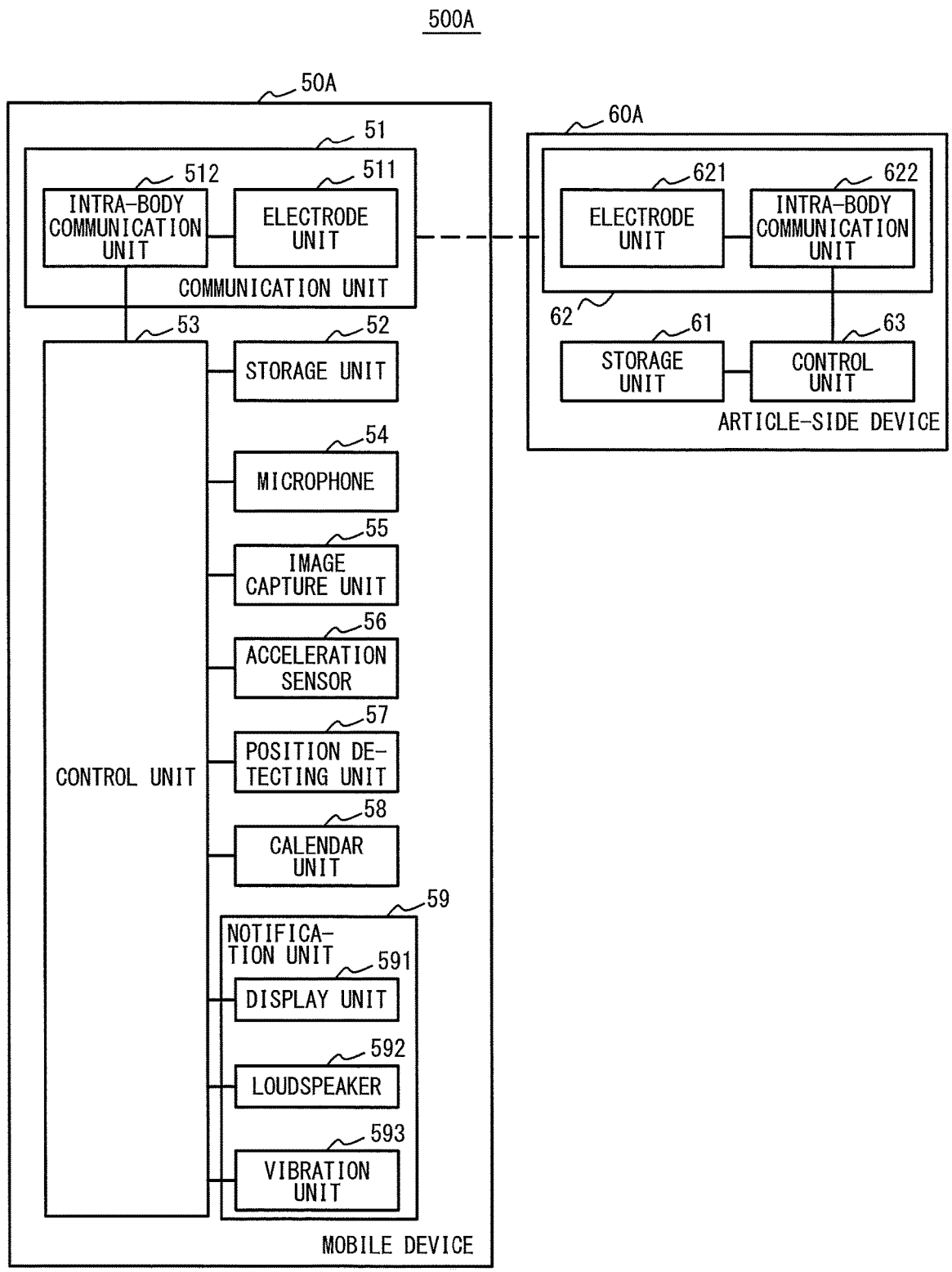
FIG. 1 illustrates a configuration of an electronic device system in accordance with a first embodiment.

Hereinafter, a detailed description will be given of a first embodiment based on FIG. 1 through FIG. 6. FIG. 1 is a block diagram illustrating a configuration of an electronic device system 500A in accordance with the first embodiment. The electronic device system 500A includes a mobile device 50A and an article-side device 60A as illustrated in FIG. 1.

(Article-Side Device 60A)

Figure 2A:
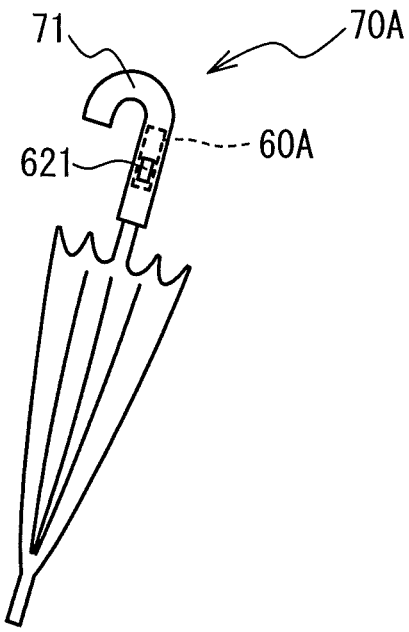
FIG. 2A illustrates an article installed with an article-side device of the first embodiment.
Figure 2B:
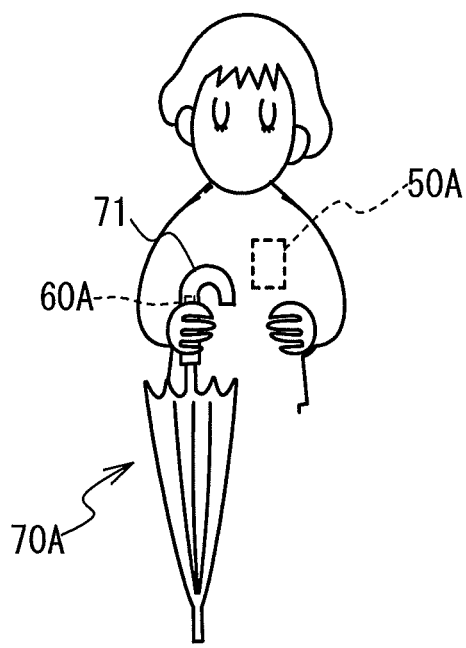
FIG. 2B and FIG. 2C illustrate a situation where the electronic device system is used.

The article-side device 60A is installed in, for example, articles such as shoes and an umbrella owned by a user. In the present embodiment, as illustrated in FIG. 2A, the article-side device 60A is located in the inside of or on the surface of a handle 71 of an umbrella 70A owned by the user.

The article-side device 60A includes, as illustrated in FIG. 1, a storage unit 61, a communication unit 62, and a control unit 63.

The storage unit 61 is a non-volatile semiconductor memory such as a flash memory, and stores information used to identify the article-side device 60A. In the present embodiment, the storage unit 61 stores the ID number of the article-side device 60A.

The communication unit 62 communicates with other devices through proximity communication such as Bluetooth (registered trademark), Felica (registered trademark), or RFID (Radio Frequency Identification), or through intra-body communication conducted via the user. In the present embodiment, the communication unit 62 includes an electrode unit 621 and an intra-body communication unit 622 that performs intra-body communication with use of the electrode unit 621, the electrode unit 621 being located in a position that comes in contact with the user (e.g., in a part of the handle 71 illustrated in FIG. 2A) in the article installed with the article-side device 60A. The intra-body communication unit 622 communicates with an intra-body communication unit 512 of the mobile device 50A described later, and transmits the ID number of the article-side device 60A stored in the storage unit 61 to the mobile device 50A. The intra-body communication is performed by an electric current method that transmits information by passing a minute electric current through a human body and modulating the electric current, an electric field method that transmits information by modulating an electric field induced on the surface of a human body, or the like. The present embodiment may employ any of the above methods. The intra-body communication is possible not only when the user does not wear anything on user's hands (i.e., when the electrode unit 621 makes contact with user's hand) but also when the user wears gloves (i.e., when the electrode unit 621 faces user's hand).

When the article-side device 60A is installed in a shoe, the electrode unit 621 may be located in a position that makes contact with the foot of the user in the shoe such as the inner side surface of the shoe or a sockliner. In this case, the intra-body communication is possible not only when the user does not wear anything on the foot (i.e., when the electrode unit 621 makes contact with the foot) but also when the user wears socks (i.e., when the electrode unit 621 faces the foot).

The control unit 63 includes a CPU (Central Processing Unit), a RAM (Random Access Memory), and a ROM (Read Only Memory), and overall controls the article-side device 60A. A process executed by the control unit 63 will be described in detail later.

(Mobile Device 50A)

The mobile device 50A is an information device that is used while being carried by the user. The mobile device 50A may be a mobile phone, a smartphone, a PHS (Personal Handy-phone System), or a PDA (Personal Digital Assistant). In the present embodiment, assume that the mobile device 50A is a smartphone. The mobile device 50A has a telephone function, a communication function for connecting to the Internet or the like, and a data processing function for executing programs. Necessary components of the mobile device 50A may be provided to an article such as a watch, glasses, or an acoustic aid wearable by the user to allow them to function as the mobile device.

As illustrated in FIG. 1, the mobile device 50A includes a communication unit 51, a storage unit 52, a control unit 53, a microphone 54, an image capture unit 55, an acceleration sensor 56, a position detecting unit 57, a calendar unit 58, and a notification unit 59.

The communication unit 51 communicates with other devices through proximity communication such as Bluetooth (registered trademark), Felica (registered trademark), or RFID, or through intra-body communication conducted via a human body. In the present embodiment, the communication unit 51 includes an electrode unit 511 and the intra-body communication unit 512 that performs intra-body communication with use of the electrode unit 511, the electrode unit 511 being located in a part of the mobile device 50A (e.g., an outer surface making contact with user's hand). The intra-body communication unit 512 communicates with the article-side device 60A through intra-body communication while the user makes contact with the article, and receives the ID number of the article-side device 60A stored in the storage unit 61 of the aforementioned article-side device 60A from the article-side device 60A. The intra-body communication is possible not only when the user makes direct contact with the mobile device 50A but also when the user wears gloves (i.e., when the electrode unit 511 faces user's hand) or when the mobile device 50A is put in a pocket of a shirt worn by the user.

The storage unit 52 is a non-volatile semiconductor memory such as a flash memory or a hard disk drive, and stores the ID number received from the article-side device 60A.

The control unit 53 includes a CPU, a RAM, and a ROM, and overall controls the mobile device 50A. The control unit 53 executes a pairing process that pairs the article-side device 60A installed in an article owned by the user and the mobile device 50A, and a determination process that determines whether the article picked up or put on by the user is user's article. The details of each process executed by the control unit 53 will be described later.

The microphone 54 collects sounds around the mobile device 50A. The acoustic data of sounds collected by the microphone 54 is input to the control unit 53.

The image capture unit 55 captures an image (a still image, a moving image). The image captured by the image capture unit 55 is input to the control unit 53.

The acceleration sensor 56 detects the acceleration of the mobile device 50A, and outputs the detection result to the control unit 53.

The position detecting unit 57 includes, for example, a GPS (Global Positioning System) sensor, and detects and outputs positional information of the user to the control unit 53.

The calendar unit 58 obtains and outputs time information such as year, month, day, and time to the control unit 53.

The notification unit 59 notifies the user of results of the pairing process and the determination process executed by the control unit 53 based on the control of the control unit 53, and includes a display unit 591, a loudspeaker 592, and a vibration unit 593.

The display unit 591 is, for example, a device using a liquid crystal display element, and displays the results of the pairing process and the determination process based on the control of the control unit 53. The loudspeaker 592 notifies the user of the results of the pairing process and the determination process with a sound based on the control of the control unit 53. The vibration unit 593 notifies the user of the results of the pairing process and the determination process by vibration based on the control of the control unit 53.

(Pairing Process)

A description will next be given of the pairing process between the article-side device 60A and the mobile device 50A with reference to flowcharts of FIG. 3A and FIG. 3B. The pairing process is executed when the user registers user's article, such as an umbrella or shoes, that the user does not want to mistake or easily mistakes for someone else's article in the mobile device 50A.

Figure 3A:
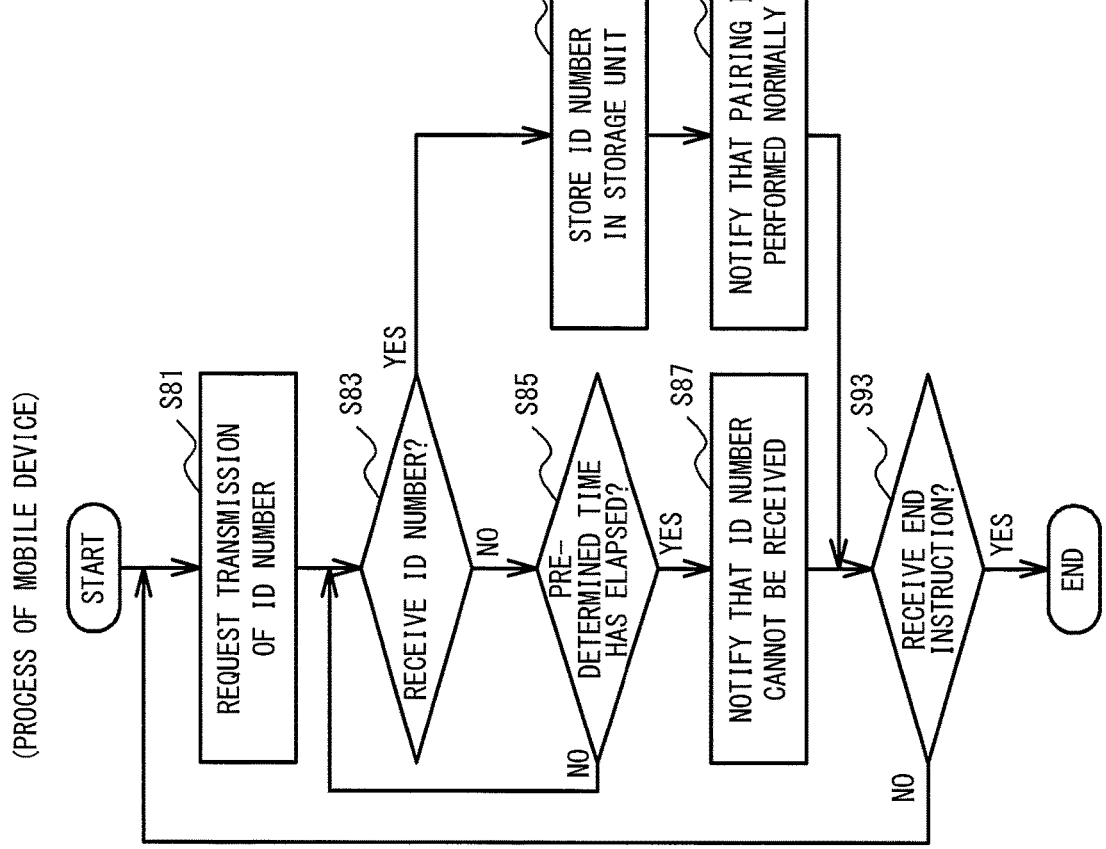
FIG. 3A is a flowchart of an exemplary process executed by a mobile device in a pairing process of the first embodiment.
Figure 3B:
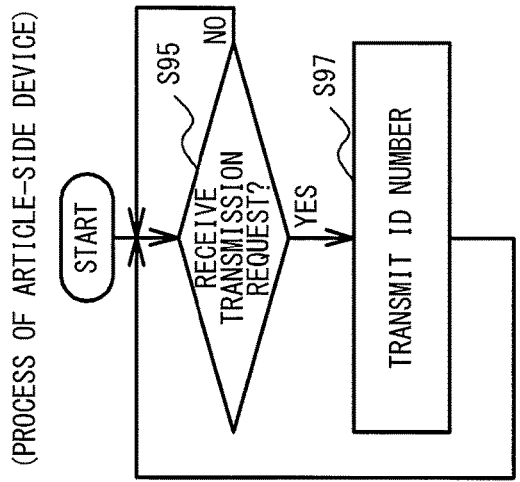
FIG. 3B is a flowchart of an exemplary process executed by the article-side device.
Figure 5:
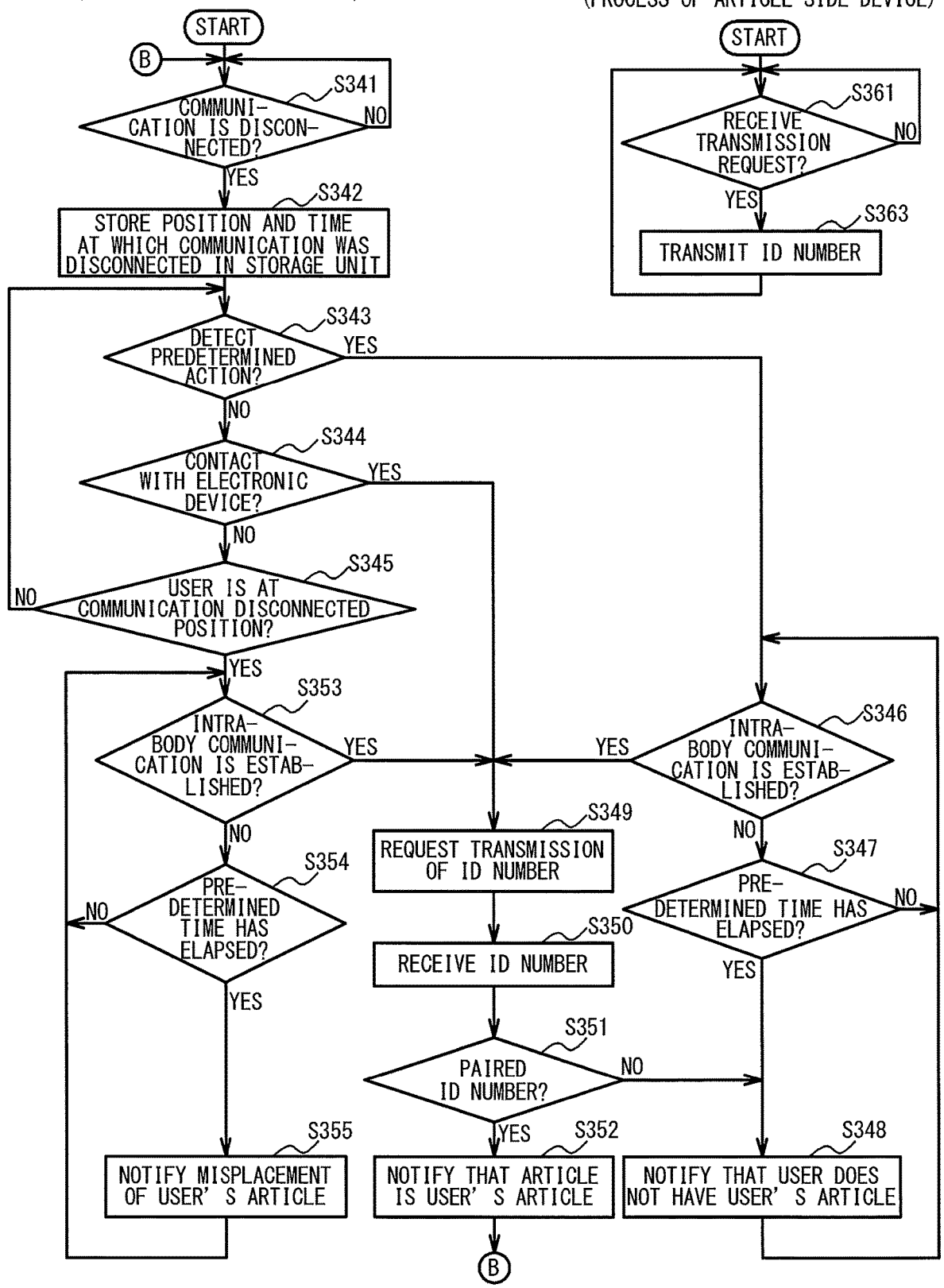
FIG. 5A is a flowchart of an exemplary process executed by the mobile device in a determination process of the first embodiment.
FIG. 5B is a flowchart of an exemplary process executed by the article-side device.

FIG. 3A is a flowchart of an exemplary process executed by the control unit 53 of the mobile device 50A, and FIG. 3B is a flowchart of an exemplary process executed by the control unit 63 of the article-side device 60A. In the present embodiment, the process of FIG. 3A is started when the user carrying the mobile device 50A set to an "initial setting mode" picks up or puts on an article (an umbrella, shoes) to be paired (see FIG. 2B), and when the intra-body communication between the mobile device 50A and the article-side device 60A is thereby established.

In the process of FIG. 3A, at step S81, the control unit 53 of the mobile device 50A requests the article-side device 60A to transmit the ID number through intra-body communication.

On the other hand, at step S95 of FIG. 3B, the control unit 63 of the article-side device 60A waits till it receives the transmission request of the ID number from the mobile device 50A. When receiving the transmission request of the ID number, the control unit 63 proceeds to step S97.

At step S97, the control unit 63 transmits the ID number of the article-side device 60A stored in the storage unit 61 to the mobile device 50A (through intra-body communication), and then returns to step S95.

On the other hand, in FIG. 3A, the control unit 53 determines whether it receives the ID number from the article-side device 60A at step S83 after it requests the article-side device 60A to transmit the ID number. When the determination here is NO, the control unit 53 proceeds to step S85, and determines whether a predetermined time (e.g., 10 seconds) has elapsed. When the predetermined time has not elapsed, the control unit 53 returns to step S83.

When the predetermined time has elapsed without the reception of the ID number, i.e., when the determination at step S83 is NO and the determination at step S85 is YES, the control unit 53 proceeds to step S87. At step S87, the control unit 53 notifies that the ID number cannot be received, and proceeds to step S93. For example, the control unit 53 outputs a sound such as "The ID number of the article-side device 60A cannot be received." from the loudspeaker 592, or displays the same message on the display unit 591 to provide the notification. Alternatively, the control unit 53 may vibrate the mobile device 50A with the vibration unit 593 to provide the notification.

On the other hand, when the ID number is received before the predetermined time elapses, i.e., when the determination at step S83 becomes YES before the determination at step S85 becomes YES, the control unit 53 proceeds to step S89. At step S89, the control unit 53 stores the received ID number in the storage unit 52. This process updates a pairing information table illustrated in FIG. 4. The pairing information table includes a field of ID number, and the field of ID number stores the ID number of the article-side device 60A received at step S83. The pairing information table illustrated in FIG. 4 stores only one ID number, but in the present embodiment, the pairing information table can store the ID numbers of the article-side devices 60A installed in an umbrella, shoes, a bag, and the like, i.e., two or more ID numbers.

At subsequent step S91, the control unit 53 notifies that the pairing is performed normally, and proceeds to step S93. For example, the control unit 53 outputs a sound such as "The pairing is normally finished." from the loudspeaker 592, or displays the same message on the display unit 591 to provide the notification. The control unit 53 may vibrate the mobile device 50A with the vibration unit 593 in a different way from the way of vibration used at step S87 to provide the notification.

At step S93, the control unit 53 determines whether it receives the instruction for ending the initial setting mode. When the determination here is NO, the control unit 53 returns to step S81. On the other hand, when receiving the instruction for ending the initial setting mode, the control unit 53 ends the process of FIG. 3A.

The aforementioned pairing process allows the user to easily register the information of the article-side device 60A installed in the article that the user does not want to mistake for someone else's article (an umbrella in the present embodiment) in the storage unit 52 of the mobile device 50A. That is to say, the mobile device 50A is easily paired with the article-side device 60A. When the mobile device 50A has an electronic payment function, the registration to the storage unit 52 of the mobile device 50A may be performed by using the touch to the article-side device 60A as a trigger after the purchase of the article-side device 60A with the electronic payment function. Alternatively, the communication unit 62 may be put into a state capable of performing communication at the time when the article-side device 60A is purchased (a communication function is disabled before selling), and the registration may be performed when the user touches the article-side device 60A at a predefined location (e.g., use's home) based on the output from the position detecting unit 57 of the mobile device 50A.

(Determination Process)

A description will next be given of the determination process that determines whether the article selected by the user from the articles of the same kind is user's article with reference to flowcharts illustrated in FIG. 5A and FIG. 5B. In the present embodiment, the process of FIG. 5A is started when the user carrying the mobile device 50A set to a determination mode picks up or puts on an article installed with the paired article-side device 60A, and when the intra-body communication between the mobile device 50A and the article-side device 60A is thereby established. Instead of setting the mobile device 50A to the determination mode, the process of FIG. 5A may be started when the user has moved a predetermined distance away (goes out) from the predetermined location (e.g., user's home) and the intra-body communication between the mobile device 50A and the article-side device 60A is established.

The following describes a case, as an example, where it rains, and where the user carries the mobile device 50A set to the determination mode and brings the umbrella 70A installed with the article-side device 60A paired with the mobile device 50A to go to a drinking party.

In the process of FIG. 5A, at step S341, the control unit 53 of the mobile device 50A determines whether the communication with the article-side device 60A is disconnected. The determination at step S341 is repeated while the user is moving to the place of the drinking party, because the user has the umbrella 70A in user's hand and thus the intra-body communication between the mobile device 50A and the article-side device 60A has been established. When the user arrives at the place of the drinking party, puts the umbrella 70A into an umbrella stand 92 illustrated in FIG. 2C, and releases the hand from the handle 71 of the umbrella 70A, the intra-body communication between the mobile device 50A and the article-side device 60A is disconnected. In this case, the determination at step S341 becomes YES, and the process moves to step S342. When the article-side device 60A is installed in a shoe, the determination at step S341 becomes YES when the user takes off the shoe.

At step S342, the control unit 53 obtains positional information of the user (the mobile device 50A) from the position detecting unit 57, obtains date and time information from the calendar unit 58, and stores the obtained information in the storage unit 52 in association with the ID number of the article-side device 60A with which the communication was disconnected. In the present embodiment, the control unit 53 stores the ID number "A12345" of the article-side device 60A paired with the mobile device 50A in the pairing information table in association with the position (the latitude, the longitude) and the date and time at which the communication with the article-side device 60A was disconnected (see FIG. 6).

Figure 2C:
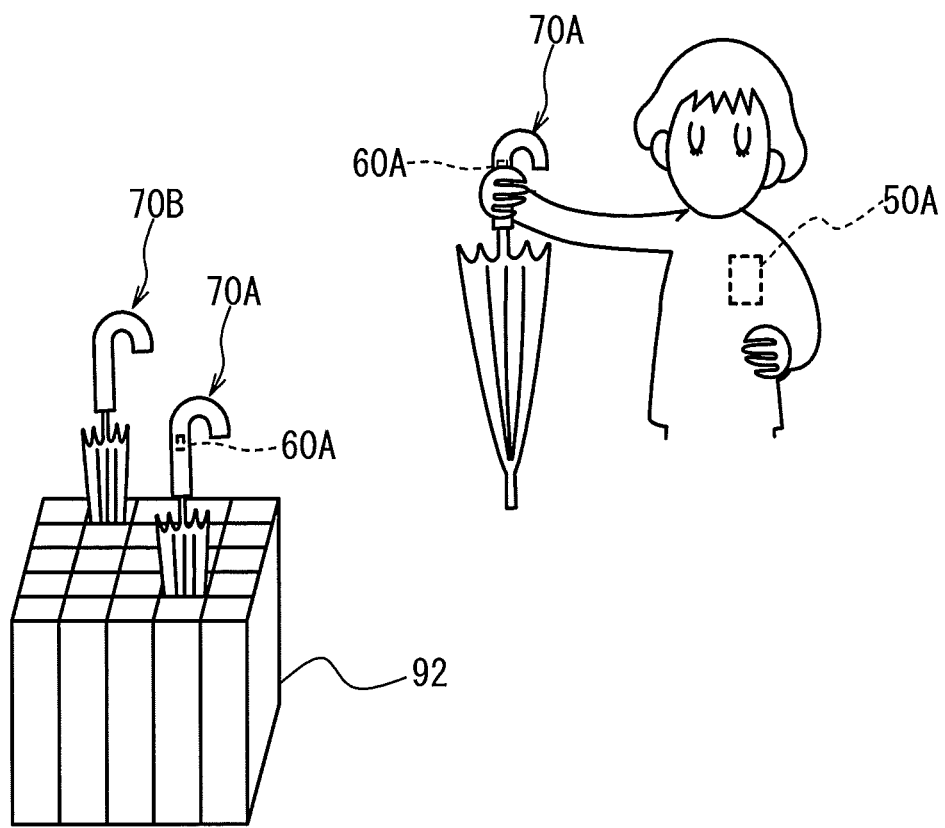

The control unit 53 then detects when the communication between the mobile device 50A and the article-side device 60A is to be established through the determination process from steps S343 to S345. Here, assume that the user finishes the drinking party, and picks up the umbrella 70A installed with the article-side device 60A from umbrellas (the umbrella 70A with the article-side device 60A, an umbrella 70B without the article-side device 60A) placed in the umbrella stand 92 as illustrated in FIG. 2C.

The control unit 53 determines whether it detects a predetermined action of the user (e.g., an action of picking up an umbrella, an action of putting on shoes, or the like) at step S343. The control unit 53 identifies the action of the user based on the acoustic data of sounds collected by the microphone 54 and the acceleration of the mobile device 50A detected by the acceleration sensor 56, and determines whether the identified action is a predetermined action. The method described in KAZUSHIGE OUCHI, MIWAKO DOI, Living Activity Recognition using an Accelerometer and a Microphone, Interaction2011 can be used to identify the action based on the acoustic data and the acceleration. In the present embodiment, assume that the control unit 53 detects user's action of picking up an umbrella. Here, since the user takes an action of picking up the umbrella 70A, the determination at step S343 becomes YES. The control unit 53 thus determines that it has detected that the communication between the mobile device 50A and the article-side device 60A is to be established, and proceeds to step S346. The control unit 53 may identify the action of the user by using an image captured by the image capture unit 55 with well-known image analysis technology.

At step S346, the control unit 53 determines whether the intra-body communication with the article-side device 60A is established. As described above, when the user picks up the umbrella 70A with the article-side device 60A, the intra-body communication with the article-side device 60A is established, and the determination at step S346 is thus YES. In this case, the control unit 53 proceeds to step S349.

At step S349, the control unit 53 requests the article-side device 60A to transmit the ID number.

On the other hand, at step S361 of FIG. 5B, the control unit 63 of the article-side device 60A waits until it receives the transmission request of the ID number from the mobile device 50A. When the transmission request of the ID number is received from the mobile device 50A, the determination at step S361 becomes YES, and the process proceeds to step S363.

At step S363, the control unit 63 transmits the ID number of own stored in the storage unit 61 to the mobile device 50A, and returns to step S361.

Back to FIG. 5A, the control unit 53 of the mobile device 50A receives the ID number from the article-side device 60A at step S350. At subsequent step S351, the control unit 53 determines whether the ID number received at step S350 is the ID number of the paired article-side device 60A. More specifically, the control unit 53 determines whether the ID number received at step S350 exists in the pairing information table of FIG. 6. In other words, at step S351, it is determined whether the communication with the paired article-side device 60A is established based on the received ID number.

The negative determination at step S351 means that the user picked up someone else's umbrella installed with the article-side device 60A from the umbrella stand 92. In this case, the control unit 53 proceeds to step S348, and notifies the user that the user does not have user's umbrella (that the user has someone else's umbrella). At this time, the control unit 53 may display that the umbrella picked up by the user is not user's umbrella on the display unit 591, may display that the user takes someone else's umbrella by mistake, may output an alert sound from the loudspeaker 592, or may vibrate the mobile device 50A with the vibration unit 593.

On the other hand, the positive determination at step S351 means that the user picked up user's umbrella from the umbrella stand 92. In this case, the control unit 53 moves to step S352, and notifies the user that the umbrella picked up by the user is user's umbrella (user's article). At this time, the control unit 53 may display that the umbrella picked up by the user is user's umbrella on the display unit 591, may output a sound different from the sound output at step S348 from the loudspeaker 592, or may vibrate the mobile device 50A in a different way from a way of vibration at step S348. The notification may not be provided to the user when the user picked up user's umbrella. After step S352, the control unit 53 returns to step S341.

When the determination at step S346 is NO, i.e., when the intra-body communication with the article-side device 60A is not established, the control unit 53 proceeds to step S347, and determines whether a predetermined time (e.g., 10 seconds) has elapsed. When the determination at step S347 is NO (when the predetermined time has not elapsed), the control unit 53 returns to step S346. On the other hand, when the determination at step S347 is YES (when the predetermined time has elapsed), the process moves to step S348. When the intra-body communication with the article-side device 60A is not established and the predetermined time has elapsed (S347: YES) although user's action of picking up an umbrella was detected (S343: YES), the user picked up an umbrella without the article-side device 60A (someone else's umbrella 70B). Thus, when the process moves to step S348, the control unit 53 notifies the user that the user does not have user's umbrella (the user has someone else's umbrella), and then returns to step S346.

When the determination at step S343 is NO, i.e., when the control unit 53 does not detect the predetermined action (the action of picking up an umbrella), the control unit 53 proceeds to step S344.

At step S344, the control unit 53 determines whether the user makes contact with the article-side device 60A (including the device installed in someone else's article), i.e., whether the intra-body communication with the article-side device 60A is established. When the determination is YES, the control unit 53 proceeds to step S349, and executes the processes and determinations after step S349 as described above. On the other hand, when the determination at step S344 is NO (when the intra-body communication with the article-side device 60A is not established), the control unit 53 proceeds to step S345.

At step S345, the control unit 53 determines whether the user is near the position at which the communication with the article-side device 60A was disconnected. It can be determined whether the user is near the position at which the communication with the article-side device 60A was disconnected based on information of the communication disconnected location stored in the pairing information table (FIG. 6) and the positional information of the user obtained from the position detecting unit 57. When the determination at step S345 is NO, the process returns to step S343. When the determination is YES, the control unit 53 proceeds to step S353.

At aforementioned step S345, the control unit 53 may determine whether a predetermined time (e.g., one hour) has elapsed from the time when the communication with the article-side device 60A was disconnected in addition. This determination prevents the processes after step S353 from being executed when the user passes by the umbrella stand 92 to go to the bathroom in the middle of the drinking party. It can be determined whether the predetermined time has elapsed from the time when the communication with the article-side device 60A was disconnected based on the information of the communication disconnected time and date stored in the pairing information table illustrated in FIG. 6 and time information obtained from the calendar unit 58.

When the determination at step S345 is YES and the process proceeds to step S353, the control unit 53 determines whether the intra-body communication with the article-side device 60A is established. When the determination is NO, the control unit 53 proceeds to step S354, and determines whether a predetermined time (e.g., 10 seconds) has elapsed. When the determination at step S354 is YES (when the predetermined time has elapsed), the process proceeds to step S355. When the intra-body communication with the article-side device 60A is not established and the predetermined time has elapsed (S354: YES) although it is determined that the user is near the position at which the communication with the article-side device 60A was disconnected (S345: YES), the user forgets picking up the umbrella. Thus, when the process moves to step S355, the control unit 53 notifies the user that the user does not have user's umbrella, i.e., that the user misplaces the umbrella.

On the other hand, when the intra-body communication with the article-side device 60A is established before the predetermined time has elapsed, i.e., when the determination at step S353 becomes YES before the determination at step S354 becomes YES, the control unit 53 executes the processes and determinations after step S349 as described above.

The process of FIG. 5A is repeated till the user ends the determination mode.

As described in detail above, according to the first embodiment, the mobile device 50A held by the user includes: the communication unit 51 that communicates with the article-side device 60A installed in an article (an umbrella) used by the user through intra-body communication conducted via the user; the control unit 53 that detects when the communication between the communication unit 51 and the article-side device 60A is to be established; and the notification unit 59 that, when the control unit 53 has detected that the communication between the communication unit 51 and the article-side device 60A is to be established, notifies whether the user has an article installed with the article-side device 60A paired with the mobile device 50A based on the communication state between the communication unit 51 and the article-side device 60A, i.e., based on whether the communication between the communication unit 51 and the article-side device 60A has been established. That is to say, the mobile device 50A notifies whether the user has the article installed with the article-side device 60A paired with the mobile device 50A at a proper timing when the communication between the communication unit 51 and the article-side device 60A is to be established. Thus, the user can know that the user misplaces user's article or takes someone else's article by mistake at a proper timing without specially managing or working on the prevention of the misplacement or the mistake.

In the first embodiment, the communication state between the communication unit 51 and the article-side device 60A is determined by whether the mobile device 50A receives the ID number of the article-side device 60A. Thus, the control unit 53 can determine that an article with the article-side device 60A or an article without the article-side device 60A having the ID number that is not paired is not user's article.

In the first embodiment, the control unit 53 detects the action of the user based on outputs from the microphone 54 and the acceleration sensor 56, and detects when the communication between the communication unit 51 and the article-side device 60A is to be established based on the action of the user. Thus, the control unit 53 determines whether the user has the article with the paired article-side device 60A based on the communication state between the communication unit 51 and the article-side device 60A when the predetermined action (the action of picking up an umbrella) has been detected, enabling to notify that the user takes someone else's article by mistake even when an article with the article-side device 60A and an article without the article-side device 60A are mixed.

In the first embodiment, the control unit 53 detects when the communication between the communication unit 51 and the article-side device 60A is to be established based on the contact state between the article-side device 60A (including the article-side device 60A installed in someone else's article) capable of communicating with the communication unit 51 and the user. Thus, the control unit 53 can execute a process of determining whether the article that the user has is user's article at a proper timing when the user touches the article-side device 60A. In this case, the control unit 53 can determine whether the article that the user has is user's article at a timing when the article-side device 60A comes in contact with the user even when the predetermined action (the action of picking up an umbrella) cannot be detected, thereby reliably preventing the user from taking someone else's article by mistake.

In the first embodiment, the mobile device 50A includes the position detecting unit 57 that detects positional information of the user, and the control unit 53 detects when the communication between the communication unit 51 and the article-side device 60A is to be established based on the positional information of the user. Thus, the control unit 53 can notify the user of the misplacement of user's article because it can determine that the user misplaces an article (the umbrella 70A) with the article-side device 60A when the user is at the position where the communication with the article-side device 60A was disconnected (near the umbrella stand 92) but the communication between the communication unit 51 and the article-side device 60A is not established.

In the above first embodiment, the article-side device 60A may be pre-installed in an article, (an article installed with the article-side device 60A is sold), or the user may install the paired article-side device 60A in user's article. The mobile device 50A may not be a multifunctional terminal such as a smartphone, and may be a dedicated terminal having only functions necessary for preventing the mistake of an article. In this case, the user may purchase the mobile device 50A and the article-side device 60A paired with each other, and may install the article-side device 60A in user's article and carry the mobile device 50A.

In the above first embodiment, the data in the pairing information table may be deleted by the user as needed. This configuration allows the determination process to be omitted with respect to the ID number of the article-side device 60A installed in an article not being used or a discarded article, enabling to reduce the time spent on the determination process. The pairing information table may have a field for the name of an article. This configuration allows the user to know the relationship between each ID number and each article installed with the article-side device 60A having the corresponding ID number.

Second Embodiment

A description will next be given of a second embodiment based on FIG. 7 through FIG. 9B. An electronic device system 500B of the second embodiment is used when the user rents a snowboard in a ski area.

Figure 7:
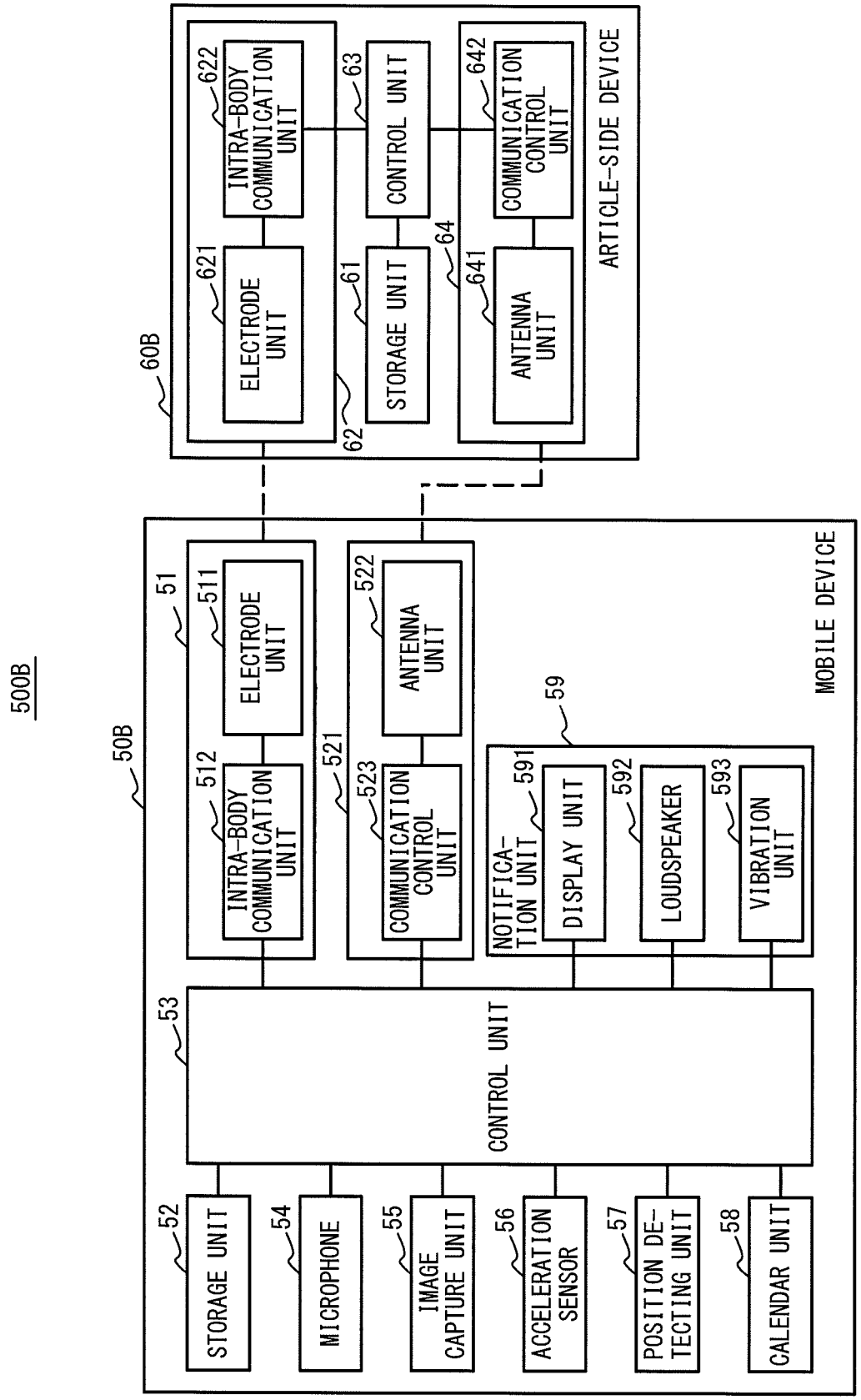
FIG. 7 illustrates a configuration of an electronic device system in accordance with a second embodiment.

The electronic device system 500B of the second embodiment includes, as illustrated in FIG. 7, a mobile device 50B and an article-side device 60B.

(Mobile Device 50B)

The mobile device 50B includes a communication unit 521 used to communicate with the article-side device 60B through proximity communication such as Bluetooth (registered trademark) or Felica (registered trademark) in addition to the same components as the mobile device 50A of the first embodiment. The communication unit 521 includes an antenna unit 522 and a communication control unit 523 used to communicate with the article-side device 60B through proximity communication.

(Article-Side Device 60B)

Figure 8A:
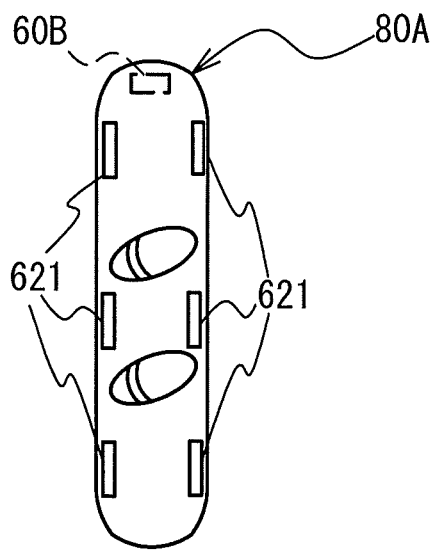
FIG. 8A illustrates an article installed with an article-side device of the second embodiment.

The article-side device 60B includes a communication unit 64 used to communicate with the mobile device 50B through proximity communication such as Bluetooth (registered trademark) or Felica (registered trademark) in addition to the same components as the article-side device 60A of the first embodiment. The communication unit 64 includes an antenna unit 641 and a communication control unit 642 used to communicate with the mobile device 50B through proximity communication. In the present embodiment, the electrode units 621 used for intra-body communication are located in positions coming in contact with user's hand when the user holds a snowboard 80A as illustrated in FIG. 8A. In the present embodiment, the intra-body communication is possible not only when the user does not wear anything on user's hands (i.e., when the electrode unit 621 makes contact with user's hand) but also when the user wears gloves (i.e., when the electrode unit 621 faces user's hand).

(Pairing Process)

In the second embodiment, assume that the article-side device 60B installed in a snowboard rented by the user in a ski area is to be paired with the mobile device 50B. In the pairing process of the second embodiment, the mobile device 50B and the article-side device 60B may be paired with each other through intra-body communication or through proximity communication as with in the first embodiment. Other processes are the same as those of the pairing process (FIG. 3A, FIG. 3B) of the first embodiment, and thus the description thereof is omitted.

(Determination Process)

FIG. 9A and FIG. 9B are flowcharts illustrating the determination process of the second embodiment. Hereinafter, a detailed description will be given of the determination process with use of a case where the user looks for the snowboard rented by the user from many snowboards as an example. The process of FIG. 9A is started when the user carries the mobile device 50B set to the determination mode, and the proximity communication between the mobile device 50B and the article-side device 60B paired with the mobile device 50B is established (when the user starts using the snowboard 80A). Instead of setting the mobile device 50B to the determination mode, the process of FIG. 9A may be started when the user carrying the mobile device 50B has moved a predetermined distance away from a predetermined place (e.g., a rental shop) and the proximity communication between the mobile device 50B and the article-side device 60B paired with the mobile device 50B is established.

Figure 8B:
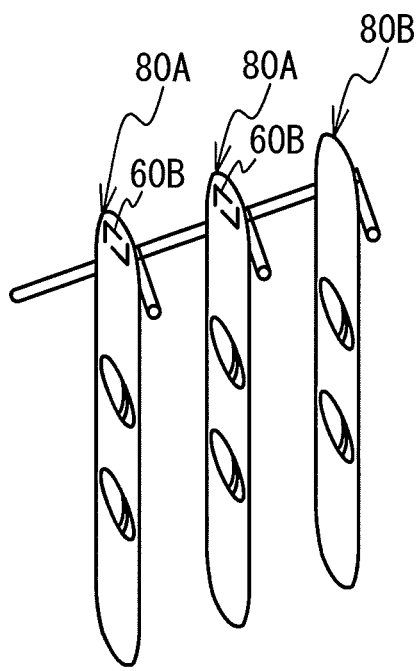
FIG. 8B and FIG. 8C illustrate a situation where the electronic device system is used.

In the process of FIG. 9A, at step S101, the control unit 53 determines whether the proximity communication with the paired article-side device 60B is disconnected. This process determines whether the user stops using the snowboard installed with the article-side device 60B. For example, assume that the user takes off the snowboard in front of a restaurant to eat lunch, and moves to the restaurant after placing the snowboard against a rack as illustrated in FIG. 8B. In this case, the proximity communication with the article-side device 60B is disconnected, and thus the determination at step S101 becomes YES. The control unit 53 proceeds to step S103.

At step S103, the control unit 53 obtains the positional information of the user (the mobile device 50B) from the position detecting unit 57, obtains date and time information from the calendar unit 58, and stores the obtained information in the storage unit 52 in association with the ID number of the article-side device 60B paired with the mobile device 50B (see FIG. 6).

At subsequent step S105, the control unit 53 waits until it detects when the proximity communication between the mobile device 50B and the article-side device 60B is to be established. In the present embodiment, the control unit 53 determines that it has detected that the proximity communication between the mobile device 50B and the article-side device 60B is to be established when the user has come out from the restaurant. The control unit 53 can determine whether the user has come out from the restaurant based on the positional information of the restaurant preliminarily stored in the storage unit 52 and the positional information of the user obtained from the position detecting unit 57. Here, assume that the user finished the meal in the restaurant and has come out from the restaurant. In this case, the determination at step S105 becomes YES, and the process moves to step S107.

At step S107, the control unit 53 displays the position where the communication with the article-side device 60B was disconnected on the display unit 591. For example, the control unit 53 may display a map on the display unit 591, and display the position where the communication was disconnected on the map. This allows the user to know the position where the user placed the snowboard, and to easily find user's snowboard.

At subsequent step S109, the control unit 53 notifies the communication state of the proximity communication with the article-side device 60B. For example, when the proximity communication is conducted through Bluetooth (registered trademark), the control unit 53 displays "out of communication range with the article-side device 60B" or "within communication range with the article-side device 60B" on the display unit 591, allowing the user to know whether the user is getting closer to user's snowboard. Alternatively, when the proximity communication is conducted through RFID, for example, the control unit 53 may output a sound corresponding to the level of the communication intensity with the article-side device 60B from the loudspeaker 592. This allows the user to know whether the user is getting closer to user's snowboard by the sound output from the loudspeaker 592, and to easily find the snowboard.

Figure 8C:
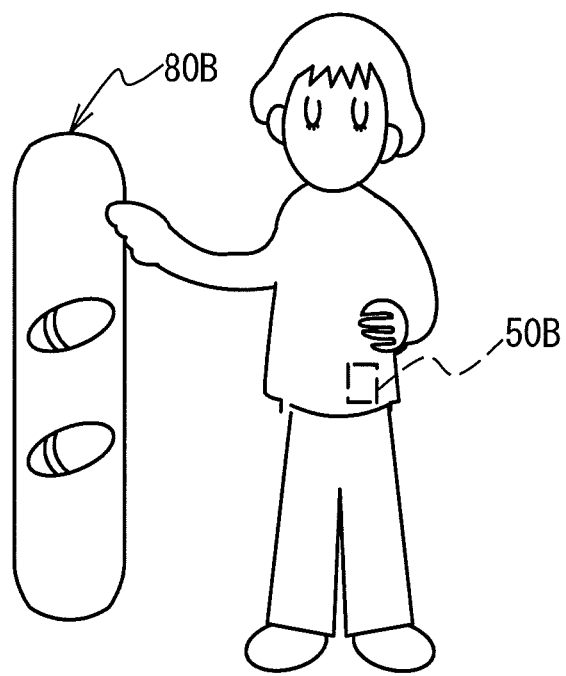

At subsequent step S111, the control unit 53 determines whether it has detected that the intra-body communication with the article-side device 60B is to be established. In this case, for example, the control unit 53 determines that it has detected that the intra-body communication between the mobile device 50B and the article-side device 60B is to be established when user's action recognized based on the acoustic data of sounds collected by the microphone 54 and the acceleration of the mobile device 50B detected by the acceleration sensor 56 is an action of picking up a snowboard. Here, assume that the user picks up the snowboard 80B as illustrated in FIG. 8C from snowboards (the snowboard 80A with the article-side device 60B and a snowboard 80B without the article-side device 60B) placed against a rack illustrated in FIG. 8B. In this case, the determination at step S111 becomes YES, and the process proceeds to step S113.

At step S113, the control unit 53 determines whether the intra-body communication with the article-side device 60B is established. When the determination here is NO, the process moves to step S115, and the control unit 53 determines whether a predetermined time (e.g., 10 seconds) has elapsed. When the determination here is YES, the process proceeds to step S117. As illustrated in FIG. 8C, when the user picked up the snowboard 80B without the article-side device 60B, the predetermined time elapses without the establishment of the intra-body communication with the article-side device 60B, and the control unit 53 thus proceeds to step S117.

At step S117, the control unit 53 notifies the user that the user takes someone else's snowboard by mistake, and goes back to step S113. At this time, the control unit 53 may display that the snowboard picked up by the user is someone else's snowboard on the display unit 591, may output a warning alarm from the loudspeaker 592, or may vibrate the mobile device 50B with the vibration unit 593. This allows the user to know that the snowboard picked up by the user is not user's snowboard. Hereinafter, assume that the user who has recognized that the snowboard picked up by the user is not user's snowboard returns the snowboard 80B to the rack, and picks up the snowboard 80A with the article-side device 60B.

When the user picks up the snowboard 80A with the article-side device 60B and the determination at step S113 becomes YES, the control unit 53 moves to step S119. At step S119, the control unit 53 requests the article-side device 60B to transmit the ID number.

On the other hand, at step S131 of FIG. 9B, the control unit 63 of the article-side device 60B waits till it receives the transmission request of the ID number from the mobile device 50B. Thus, when the control unit 63 receives the transmission request of the ID number from the mobile device 50B, the determination at step S131 becomes YES, and the process proceeds to step S133. At step S133, the control unit 63 transmits the ID number of own stored in the storage unit 61 to the mobile device 50B, and then returns to step S131.

Back to FIG. 9A, the control unit 53 of the mobile device 50B receives the ID number from the article-side device 60B at step S121. At subsequent step S123, the control unit 53 determines whether the ID number received at step S121 is the ID number of the paired article-side device 60B (whether the received ID number is stored in the pairing information table). That is to say, the control unit 53 determines whether the intra-body communication with the paired article-side device 60B has been established.

The negative determination at step S123 means that the user picked up someone else's snowboard with the article-side device 60B. In this case, the control unit 53 moves to step S117, and notifies the user that the user takes someone else's snowboard by mistake.

On the other hand, the positive determination at step S123 means that the user picked up user's snowboard. In this case, the control unit 53 moves to step S125, and notifies the user that the snowboard picked up by the user is user's snowboard (that the user does not take someone else's snowboard by mistake). At this time, the control unit 53 may display that the snowboard picked up by the user is user's snowboard on the display unit 591, or may output a sound different from the sound output at step S117 from the loudspeaker 592. Alternatively, the control unit 53 may vibrate the mobile device 50B in a different way from a way of vibration at step S117. After step S125, the control unit 53 returns to step S101.

The process of FIG. 9A is repeated as described above till the user ends the determination mode.

As described in detail above, according to the second embodiment, the mobile device 50B held by the user includes: the communication unit 51 that communicates with the article-side device 60B through intra-body communication conducted via the user; the communication unit 521 that communicates with the article-side device 60B through proximity communication; the control unit 53 that detects when communication between the communication unit 51 and the communication unit 521 and the article-side device 60B installed in the snowboard is to be established; and the notification unit 59 that, when the control unit 53 has detected that the communication between the communication unit 51 and the communication unit 521 and the article-side device 60B is to be established, notifies whether a snowboard selected by the user is a snowboard installed with the paired article-side device 60B based on the communication state between the communication unit 51 and the article-side device 60B. Thus, whether the snowboard selected by the user is the snowboard installed with the paired article-side device 60B is notified at a proper timing when the communication between the communication unit 51 and the communication unit 521 and the article-side device 60B installed in the snowboard is to be established. Therefore, when selecting the snowboard rented by the user from many snowboards, the user can be prevented from taking someone else's snowboard by mistake.

In the second embodiment, the display unit 591, the loudspeaker 592, and the vibration unit 593 notify the user of the positional relation (far, close) between the paired article-side device 60B and the user (the mobile device 50B) by changing the display form, the sound, or the way of vibration in accordance with the communication state (communication intensity) between the communication unit 521 and the article-side device 60B. Thus, the user can know whether the user is getting closer to user's snowboard, and reduce the time taken for the user to find the snowboard.

Additionally, the display unit 591 notifies the position where the communication between the communication unit 521 and the article-side device 60B was disconnected. Thus, the user can know a rough position where the user placed the snowboard, and can reduce the time taken to find user's snowboard.

In the above second embodiment, the article-side device 60B is installed in a rental snowboard, but this does not intend to suggest any limitation. The user may install the article-side device 60B in the snowboard owned by the user. Not limited to the snowboard, skis, a ski suit, skates, or a bowling ball may be installed with the article-side device 60B. Additionally, the mobile device 50B may not be a device having multiple functions such as a smartphone, and may be a dedicated terminal having only functions necessary for preventing the mistake. In this case, for example, a staff of a rental shop may pair the mobile device 50B with the article-side device 60B in advance, and rent the mobile device 50B paired with the article-side device 60B together when lending a snowboard installed with the article-side device 60B.

Third Embodiment

A description will next be given of a third embodiment based on FIG. 10 through FIG. 12B. An electronic device system 500C of the third embodiment is used to prevent the mistake of a glass at a buffet party or the like.

Figure 10:
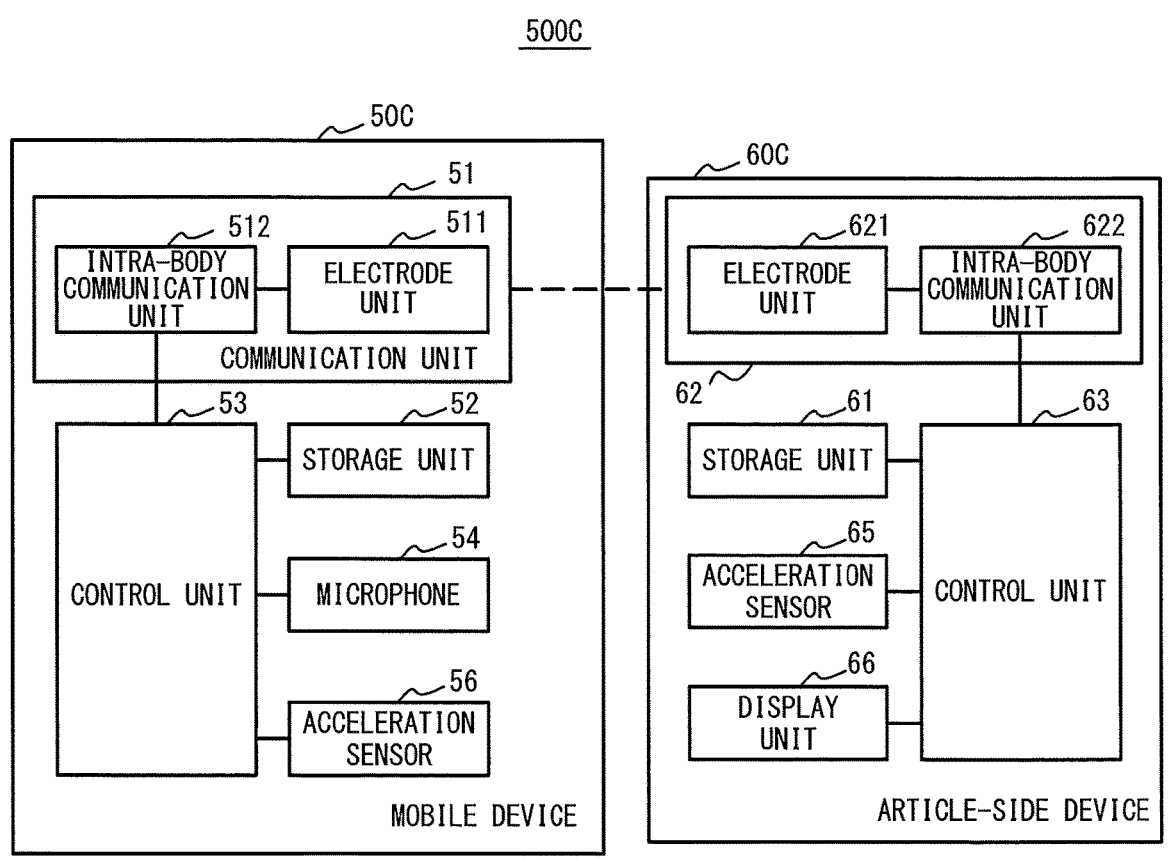
FIG. 10 illustrates a configuration of an electronic device system in accordance with a third embodiment.

FIG. 10 is a block diagram of the electronic device system 500C in accordance with the third embodiment. As illustrated in FIG. 10, the electronic device system 500C includes a mobile device 50C and an article-side device 60C.

(Mobile Device 50C)

The mobile device 50C is an information device used while being carried by the user. In the description hereinafter, assume that the mobile device 50C is a dedicated terminal for preventing the mistake of an article, and all party participants carry it, but waitpersons (waiters, waitresses) do not carry it.

The mobile device 50C includes, as illustrated in FIG. 10, the communication unit 51, the storage unit 52, the control unit 53, the microphone 54, and the acceleration sensor 56.

The communication unit 51 communicates with other devices through proximity communication such as Bluetooth (registered trademark), Felica (registered trademark), or RFID, or through intra-body communication conducted via a human body. In the present embodiment, the communication unit 51 includes the electrode unit 511 and the intra-body communication unit 512 that conducts intra-body communication with use of the electrode unit 511, the electrode unit 511 being located in a part of the housing of the mobile device 50C and making contact with the user. The intra-body communication unit 512 communicates with the article-side device 60C through intra-body communication while the user has a glass installed with the article-side device 60C in user's hand, and transmits the ID number of the mobile device 50C stored in the storage unit 52 described later to the article-side device 60C. The intra-body communication is possible not only when the user makes direct contact with the mobile device 50C but also when the user wears gloves (i.e., when the electrode unit 511 faces user's hand), or when the mobile device 50C is put in a pocket of the clothes worn by the user.

The storage unit 52 is a non-volatile semiconductor memory such as a flash memory, and stores the information used to identify the mobile device 50C. In the present embodiment, the storage unit 52 stores the ID number of the mobile device 50C.

The control unit 53 includes a CPU, a RAM, and a ROM, and overall controls the mobile device 50C. The details of the process executed by the control unit 53 will be described later.

The microphone 54 collects sounds around the mobile device 50C. The acoustic data of sounds collected by the microphone 54 is input to the control unit 53.

The acceleration sensor 56 detects the acceleration of the mobile device 50C, and outputs the detection result to the control unit 53.

(Article-Side Device 60C)

Figure 11A:
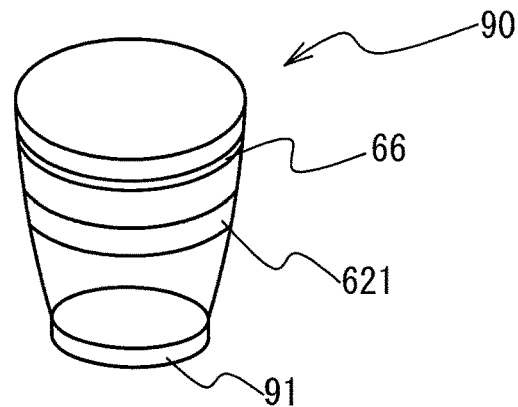
FIG. 11A illustrates an article installed with an article-side device of the third embodiment.
Figure 11B:
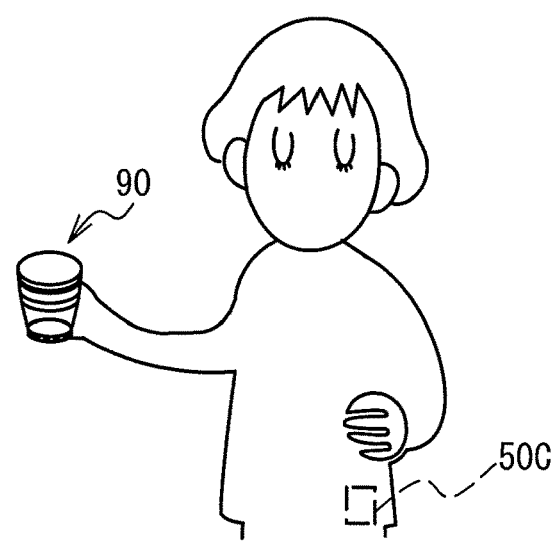
FIG. 11B and FIG. 11C illustrate a situation where the electronic device system is used.
Figure 11C:
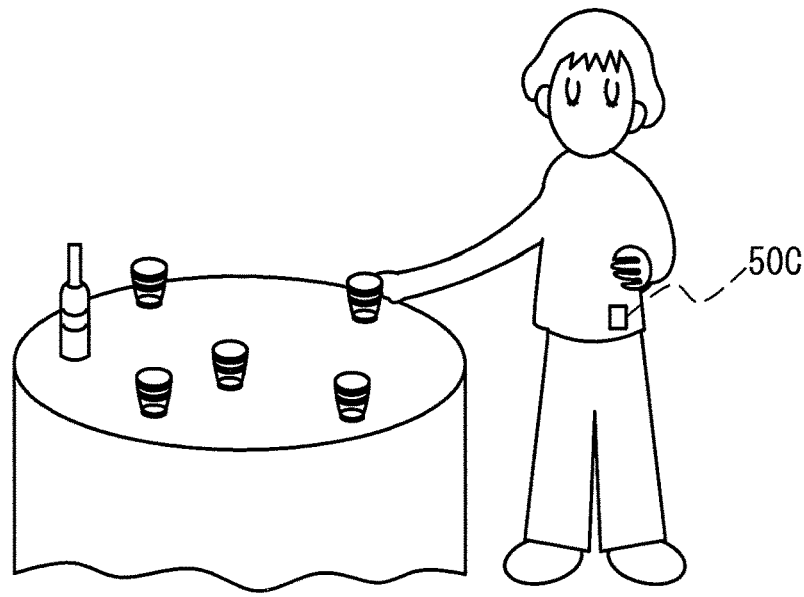

The article-side device 60C is installed in a glass 90 used at a party as illustrated in FIG. 11A. In the present embodiment, all the glasses 90 used at the party are installed with the article-side device 60C. As illustrated in FIG. 10 and FIG. 11A, the article-side device 60C includes the storage unit 61, the communication unit 62, the control unit 63, an acceleration sensor 65, and a display unit 66.

The storage unit 61 is a non-volatile semiconductor memory such as a flash memory, and stores information used to identify the mobile device 50C (the ID number) received from the mobile device 50C.

The communication unit 62 communicates with other devices through proximity communication such as Bluetooth (registered trademark), Felica (registered trademark), or RFID, or through intra-body communication conducted via the user. In the present embodiment, the communication unit 62 includes the electrode unit 621 and the intra-body communication unit 622 that conducts intra-body communication with use of the electrode unit 621, the electrode unit 621 being located in a part of the glass 90 (an outer surface making contact with the user (see FIG. 11A)). The intra-body communication unit 622 communicates with the intra-body communication unit 512 of the mobile device 50C, and receives the ID number of the mobile device 50C from the mobile device 50C. The intra-body communication is possible not only when the user does not wear anything on user's hand (i.e., when the electrode unit 621 makes contact with user's hand) but also when the user wears gloves (i.e., when the electrode unit 621 faces user's hand).

The control unit 63 includes a CPU, a RAM, and a ROM, and overall controls the article-side device 60C. The details of the process executed by the control unit 63 will be described later.

The acceleration sensor 65 detects the acceleration of the article-side device 60B, and outputs the detection result to the control unit 63. In the present embodiment, the control unit 63 and the acceleration sensor 65 are housed in an electronic component housing unit 91 located in the bottom of the glass 90 illustrated in FIG. 11A.

The display unit 66 notifies the user of the results of the pairing process and the determination process described later, and includes, in the present embodiment, a blue LED and a red LED. The display unit 66 turns on the blue LED or turns on the red LED under the control of the control unit 63.

A description will next be given of the process executed by the control unit 53 of the mobile device 50C and the process executed by the control unit 63 of the article-side device 60C with use of flowcharts of FIG. 12A and FIG. 12B. In the present embodiment, the process of FIG. 12A is started when the user who is a party participant turns on the power of the mobile device 50C, and the process of FIG. 12B is started when a waitperson or the like turns on the power of the article-side device 60C.

In the process of FIG. 12A, at step S401, the control unit 53 of the mobile device 50C waits till it detects when the intra-body communication with the article-side device 60C is to be established. In the present embodiment, the control unit 53 recognizes the action of the user based on the acoustic data of sounds collected by the microphone 54 and the acceleration of the mobile device 50C detected by the acceleration sensor 56. When the recognized action is an action of picking up a glass, the control unit 53 determines that it has detected that the communication between the mobile device 50C and the article-side device 60C is to be established. For example, when the user carrying the mobile device 50C has entered the party and picks up a new glass, the control unit 53 proceeds to step S403.

At step S403, the control unit 53 waits till the intra-body communication with the article-side device 60C is established. When the intra-body communication with the article-side device 60C is established, the control unit 53 proceeds to step S405. At step S405, the control unit 53 transmits the ID number of the mobile device 50C stored in the storage unit 52 to the article-side device 60C, and returns to step S401.

On the other hand, at step S421 of FIG. 12B, the control unit 63 of the article-side device 60C waits till the glass is picked up based on the output of the acceleration sensor 65. The control unit 63 determines that the glass is picked up when the acceleration of the glass detected by the acceleration sensor 65 is equal to or greater than a threshold value. When the user picks up the glass, the control unit 63 proceeds to step S423.

At step S423, the control unit 63 determines whether the intra-body communication with the mobile device 50C is established. When the determination here is NO, the process moves to step S425, and the control unit 53 determines whether a predetermined time (e.g., 10 seconds) has elapsed. When the predetermined time has not elapsed, the control unit 53 returns to step S423. Since the party participant carries the mobile device 50C, when the party participant picks up the glass 90, the intra-body communication with the mobile device 50C is supposed to be established within the predetermined time period. That is to say, when the determination at step S423 becomes YES before the determination at step S425 becomes YES, the person who picked up the glass is a party participant. When the determination at step S423 becomes YES and the process moves to step S427, the control unit 63 receives the ID number of the mobile device 50C from the mobile device 50C.

At subsequent step S429, the control unit 63 determines whether an ID number is already stored in the pairing information table stored in the storage unit 61.

When the determination here is NO, the control unit 63 proceeds to step S431. The reason why the determination at step S429 is NO is because the user is a first person who picks up the glass 90.

At step S431, the control unit 63 stores the ID number of the mobile device 50C with which the intra-body communication has been established in the pairing information table of the storage unit 61. This process pairs the mobile device 50C with the article-side device 60C installed in the glass 90 that was picked up by the user. In the present embodiment, the pairing information table stores only one ID number of the mobile device 50C.

At subsequent step S433, the control unit 63 notifies the user that the pairing is performed normally. For example, the blue LED of the display unit 66 is turned on once. This allows the user to confirm that the mobile device 50C carried by the user has been paired with the glass.

A description will next be given of a case where the user puts a glass filled with beverage on a table at the middle of the party and after a while, picks up a glass on the table again. In this case, in the process of FIG. 12A, the determinations at steps S401 and S403 become YES. The control unit 53 of the mobile device 50C then transmits the ID number at step S405, and returns to step S401.

On the other hand, the control unit 63 of the article-side device 60B executes processes of steps S421 to S427 in the process of FIG. 12B, and performs the determination at step S429. Here, when the glass 90 was once used by someone else, the ID number of someone else is already stored in the pairing information table of the article-side device 60C thereof. Thus, in such a case, the determination at step S429 of FIG. 12B becomes YES, and the control unit 63 proceeds to step S435.

At step S435, the control unit 63 determines whether the ID number received at step S427 is the ID number of the paired mobile device 50C. That is to say, the control unit 63 determines whether the ID number received at step S427 is the same as the ID number stored in the pairing information table.

For example, when the glass picked up by the user is the glass that was used by another participant, the ID number received at step S427 is not the same as the ID number stored in the pairing information table. Thus, in such a case, the determination at step S435 becomes NO, and the control unit 63 notifies that the glass picked up by the user is not user's glass at step S439. For example, the control unit 63 turns on the red LED of the display unit 66 twice. This allows the user to know that the glass picked up by the user is not the glass that was used by the user, and prevents the user from erroneously using the glass that was used by another participant.

On the other hand, when the glass picked up by the user is the glass that was used by the user, the ID number received at step S427 is the same as the ID number stored in the pairing information table. Thus, in such a case, the determination at step S435 becomes YES, and the control unit 63 notifies that the glass picked up by the user is user's glass at step S437. For example, the control unit 63 turns on the blue LED of the display unit 66 twice. This allows the user to confirm that the user picked up the correct glass. After step S437, the process returns to step S421.

Assume that the user then gets a drink down and the waitperson picks up the glass put on a table to clear off (step S421/YES). Since the waitperson does not carry the mobile device 50C, when the waitperson picks up the glass, the intra-body communication with the mobile device 50C is not established even when the predetermined time has elapsed. Thus, the determination at step S423 becomes NO, and the determination at step S425 becomes YES. The control unit 63 thus proceeds to step S441.

At step S441, the control unit 63 initializes the pairing information table stored in the storage unit 61. That is to say, the control unit 63 deletes the ID number stored in the pairing information table to empty the pairing information table. This allows the pairing information table to store a new ID number when the glass that was cleared off by a waitperson and washed is used. The control unit 63 may notify the waitperson that the pairing information table is emptied by turning on the blue LED of the display unit 66 for a predetermined period at step S441.

As described above, the article-side device 60C repeats the process of FIG. 12B till it is turned off.

As described in detail above, according to the third embodiment, the article-side device 60C installed in the glass 90 includes: the communication unit 62 that communicates with the mobile device 50C through intra-body communication conducted via the user; the control unit 63 that detects when the communication between the communication unit 62 and the mobile device 50C is to be established; and the display unit 66 that, when the control unit 53 has detected that the communication between the communication unit 62 and the mobile device 50C is to be established, notifies whether the article-side device 60C installed in the glass picked up by the user is the article-side device 60C paired with the mobile device 50C based on the communication state between the communication unit 62 and the mobile device 50C. As described above, whether the glass held (picked up) by the user is the glass paired with the mobile device 50C is notified at a proper timing when the communication between the communication unit 62 and the article-side device 60C installed in the glass 90 is to be established. Thus, when the user selects the glass that was used by the user from many glasses, the user is prevented from taking a glass that was used by someone else by mistake.

In the above third embodiment, the mobile device 50C is a dedicated terminal for preventing the user from taking someone else's article by mistake, but this does not intend to suggest any limitation. For example, the mobile device 50C may be a smartphone as with in the first and second embodiments.

The above third embodiment describes a case where the article-side device 60C is installed in a glass, but does not intend to suggest any limitation. For example, the article-side device 60C may be installed in eating utensils such as chopsticks, spoons, forks, or dishes. In addition, regarding other articles, the electronic device system 500C of the third embodiment may be used when the user needs to select an article once used by the user from many articles.

Fourth Embodiment

Figure 13:
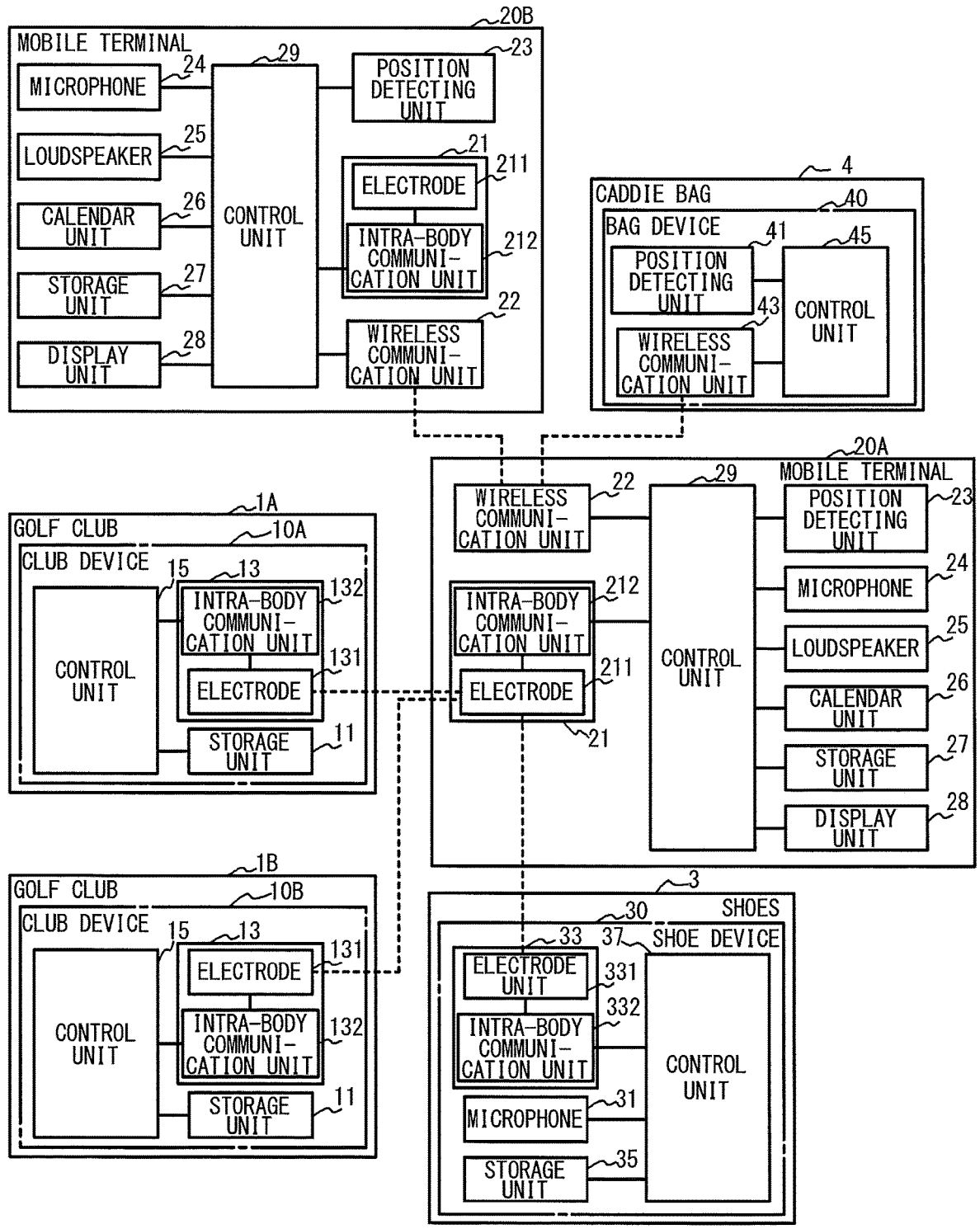
FIG. 13 illustrates a configuration of an electronic device system in accordance with a fourth embodiment.
Figure 14:
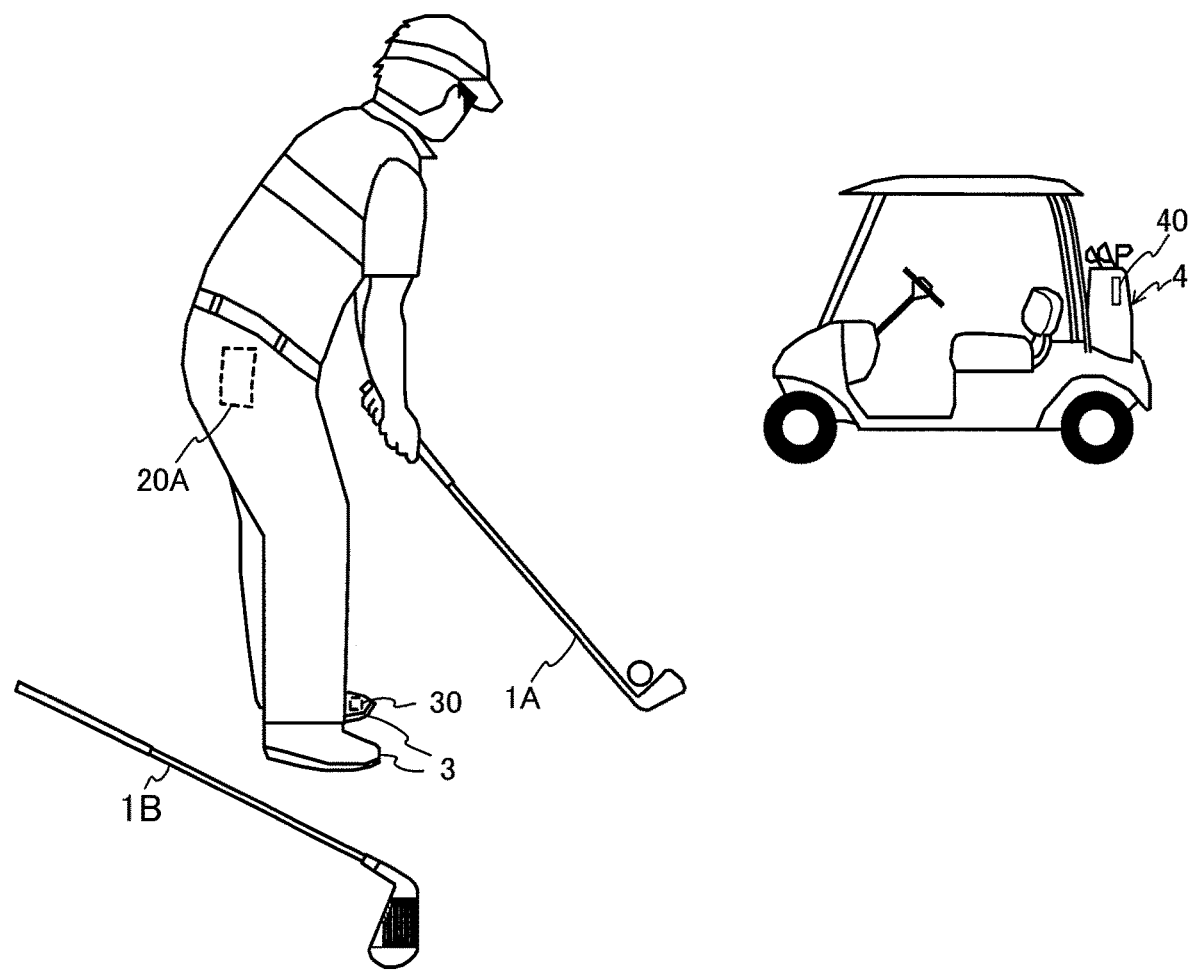
FIG. 14 illustrates a situation where the electronic device system of the fourth embodiment is used.

Hereinafter, a detailed description will be given of a fourth embodiment based on FIG. 13 to FIG. 18F. FIG. 13 is a block diagram illustrating a configuration of an electronic device system 500D in accordance with the fourth embodiment. FIG. 14 illustrates a situation where the electronic device system 500D is used.

The electronic device system 500D is used when the user plays sport. The present embodiment describes a case where the user uses the electronic device system 500D when the user plays golf as illustrated in FIG. 14.

The electronic device system 500D includes, as illustrated in FIG. 13 and FIG. 14, club devices 10A, 10B installed in golf clubs 1A, 1B, mobile terminals 20A, 20B, a shoe device 30 installed in shoes 3, and a bag device 40 installed in a caddie bag 4.

(Club Devices 10A, 10B)

The club devices 10A, 10B are installed in golf clubs. Hereinafter, the club devices 10A, 10B have the same configuration, and thus are described as a club device 10 as long as they do not need to be discriminated between them.

The golf club includes drivers, irons, and a putter (P). The drivers include 1W, 3W, and 5W, and the irons include 3I to 9I, PW (pitching wedge), AW (approach wedge), and SW (sand wedge). In this embodiment, each golf club is installed with the club device 10. FIG. 13 illustrates a golf club 1A and a golf club 1B as examples of the golf club. The club device 10A is the club device 10 installed in the golf club 1A, and the club device 10B is the club device 10 installed in the golf club 1B, for convenience sake. Hereinafter, the description will be given with use of the golf club 1A and the golf club 1B, but they are described as a golf club 1 as long as they do not need to be discriminated between them.

The club device 10 includes, as illustrated in FIG. 13, a storage unit 11, a communication unit 13, and a control unit 15.

The storage unit 11 is a non-volatile semiconductor memory such as a flash memory, and stores the owner of, number information (1W, 3W, 5W, 3 to 9I, PW, AW, SW, P) of, a manufacturer of, a name of product of, and a model number of the golf club 1.

Figure 15:
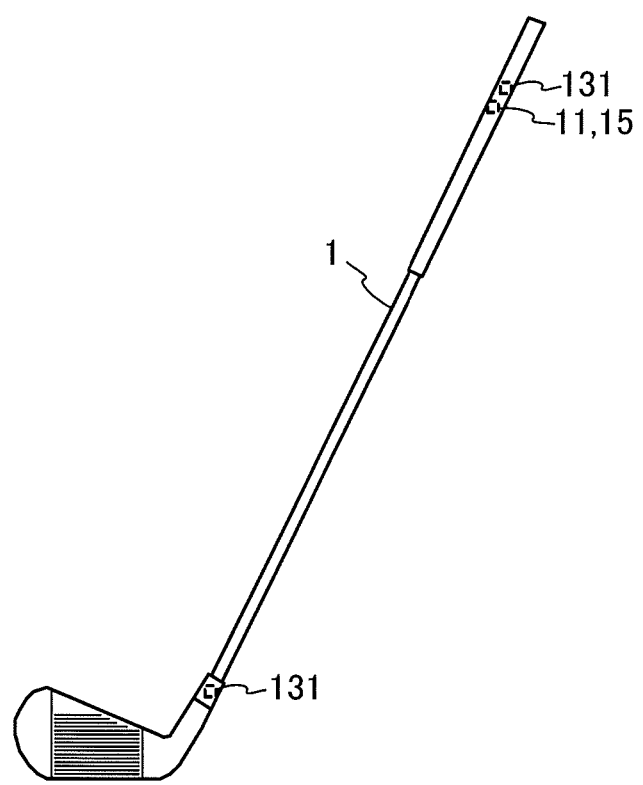
FIG. 15 illustrates a golf club and an installation position of a club device.

The communication unit 13 communicates with the mobile terminals 20A, 20B through proximity communication such as Bluetooth (registered trademark), Felica (registered trademark), or RFID, or through intra-body communication conducted via the user. In the present embodiment, the communication unit 13 includes an intra-body communication unit 132 that communicates with the intra-body communication units 212 of the mobile terminals 20A, 20B through intra-body communication with use of an electrode 131 located in the grip of or near the clubhead of the golf club 1 as illustrated in FIG. 15. The intra-body communication unit 132 transmits the owner of and the number information of the golf club 1 stored in the storage unit 11 to the mobile terminals 20A, 20B. The intra-body communication may be conducted by an electric current method that transmits information by passing a minute electric current through a human body and modulating the electric current, an electric field method that transmits information by modulating an electric field induced on the surface of a human body, or the like. The fourth embodiment may use any of the electric current method and the electric field method. The intra-body communication is possible not only when the user does not wear anything on user's hands (i.e., when the electrode 131 makes contact with user's hand) but also when the user wears gloves (i.e., when the electrode 131 faces user's hand).

The control unit 15 includes a CPU, a RAM, and a ROM, and overall controls the club device 10. In this embodiment, the control unit 15 controls the data transmission to the mobile terminals 20A, 20B. The control unit 15 and the storage unit 11 may be located in any position of the golf club 1. In this embodiment, they are located in the grip of the golf club 1.

(Mobile Terminals 20A, 20B)

The mobile terminals 20A, 20B are information devices used while being carried by the user. The mobile terminals 20A, 20B may be a mobile phone, a smartphone, a PHS, a PDA, or the like. In the present embodiment, the mobile terminals 20A, 20B are smartphones. The mobile terminals 20A, 20B have a telephone function, a communication function for connecting to the Internet or the like, and a data processing function for executing programs. The necessary components of the mobile terminals 20A, 20B (e.g., a position detecting unit 23 and a wireless communication unit 22) may be installed in an article such as a watch, glasses, an acoustic aid, a cap, or the shoes 3 wearable by the user, or an article such as a remote control for remote controlling a cart carried by the user to use them as a mobile terminal. In the present embodiment, assume that a user A uses the mobile terminal 20A, and a user B uses the mobile terminal 20B. The mobile terminal 20A and the mobile terminal 20B have the same configuration, and thus are described as a mobile terminal 20 as long as they do not need to be discriminated between them.

The mobile terminal 20 includes a communication unit 21, the wireless communication unit 22, the position detecting unit 23, a microphone 24, a loudspeaker 25, a calendar unit 26, a storage unit 27, a display unit 28, and a control unit 29.

The communication unit 21 communicates with the club device 10 and the shoe device 30 through proximity communication such as Bluetooth (registered trademark), Felica (registered trademark), and RFID, or through intra-body communication conducted via the user. In the present embodiment, the communication unit 21 includes an intra-body communication unit 212 that communicates with the intra-body communication unit 132 of the club device 10 and the intra-body communication unit 332 of the shoe device 30 through intra-body communication with use of an electrode 211 attached to the user or installed in the mobile terminal 20. The intra-body communication unit 212 communicates with the club device 10 through intra-body communication while the user is holding the golf club 1, and receives the information on the owner of and the number information of the golf club 1 from the club device 10. The intra-body communication unit 212 communicates with the shoe device 30 installed in the shoes 3 worn by the user through intra-body communication, and receives the acoustic data of sounds collected by the microphone 31 of the shoe device 30 from the shoe device 30. The intra-body communication is possible not only when the user makes direct contact with the mobile terminal 20 but also when the user makes contact with the mobile terminal 20 through a shirt or trousers. Instead of intra-body communication, proximity communication such as Bluetooth (registered trademark), RFID, or TransferJet (registered trademark) may be employed.

The wireless communication unit 22 communicates with other mobile terminals and the bag device 40. The wireless communication unit 22 receives information on whether the golf club 1 owned by the user of the mobile terminal 20 is held by another user from another mobile terminal (the details will be described later).

The position detecting unit 23 includes, for example, a GPS sensor, and detects the position of the mobile terminal 20 (e.g., the latitude and the longitude). In the present embodiment, since the user holds the mobile terminal 20, the position detecting unit 23 detects the position of the user.

The microphone 24 is a sensor that obtains sounds around the mobile terminal 20. The microphone 24 is located below the display unit 28 on a principal surface of the mobile terminal 20 (the surface on which the display unit 28 is provided) for example, and is located near the mouth of the user when the user uses the mobile terminal 20.

The loudspeaker 25 outputs a sound, and for example, is located above the display unit 28 on the principal surface of the mobile terminal 20, and is located near the ear of the user when the user uses the telephone function of the mobile terminal 20.

The calendar unit 26 obtains and outputs time information such as year, month, day, and time to the control unit 29. The calendar unit 26 has a clocking function.

The storage unit 27 is, for example, a non-volatile or volatile semiconductor memory, or a hard disk drive, and stores the information on the golf club 1 received from the club device 10 (the owner and the number information), and the location where the communication with the club device 10 was disconnected. In addition, the position, the time, and the number information of the golf club 1 when the user hit a ball may be stored.

The display unit 28 is, for example, a device using a liquid crystal display element, and displays various information based on the control of the control unit 29.

The control unit 29 includes a CPU, a RAM, and a ROM, and overall controls the mobile terminal 20. In the present embodiment, the control unit 29 controls the various recording in the storage unit 27, and controls to notify the user of the misplacement when the user misplaced the golf club 1 in a course. The process executed by the control unit 29 will be described later.

(Shoe Device 30)

The shoe device 30 is installed in the shoes (golf shoes) 3. The shoe device 30 includes a microphone 31, a communication unit 33, a storage unit 35, and a control unit 37. Each component may be located in one of a left shoe and a right shoe, or may be located in both of them.

The microphone 31 is located in a toe, and collects and outputs sounds around the shoes 3 to the control unit 37. The microphone 31 is preferably a microphone having a good directional characteristic, and may be, for example, a microphone installed with a pre-amplifier. The output of the microphone 31 is amplified by the amplifier, and recorded in the storage unit 35 as acoustic data under the control of the control unit 37 (e.g., see Japanese Patent Application Publication No. 10-267744). When the user is right-handed, a ball is placed near the left foot, and thus the microphone 31 may be installed in a left shoe. When the user is left-handed, a ball is placed near the right foot, and thus the microphone 31 may be installed in a right shoe.

The communication unit 33 communicates with the mobile terminal 20 through proximity communication such as Bluetooth (registered trademark), Felica (registered trademark), or RFID, or through intra-body communication conducted via a human body. In the present embodiment, the communication unit 33 includes an intra-body communication unit 332 that conducts intra-body communication with use of an electrode 331 located in the shoes 3. The intra-body communication unit 332 transmits the acoustic data of sounds collected by the microphone 31 and stored in the storage unit 35 to the mobile terminal 20 under the control of the control unit 37. The electrode 331 for intra-body communication is located in a position making contact with the foot of the user (the inside of the shoes 3). The intra-body communication is possible not only when the user does not wear anything on user's feet (i.e., the electrode 331 makes contact with user's foot) but also when the user wears socks (i.e., when the electrode 331 faces user's foot).

(Bag Device 40)

The bag device 40 is installed in the caddie bag 4. The caddie bag 4 houses thr golf clubs 1. The bag device 40 includes, as illustrated in FIG. 13, a position detecting unit 41, a wireless communication unit 43, and a control unit 45.

The position detecting unit 41 includes, for example, a GPS sensor, and detects the position of the caddie bag 4 (e.g., the latitude and the longitude).

The wireless communication unit 43 communicates with the mobile terminal 20 over a radio. The wireless communication unit 43 transmits the position of the caddie bag 4 detected by the position detecting unit 41 to the mobile terminal 20. This allows the control unit 29 of the mobile terminal 20 to obtain the positional relation between the caddie bag 4 and the user.

The control unit 45 includes a CPU, a RAM, and a ROM, and overall controls the bag device 40.

Figure 16:
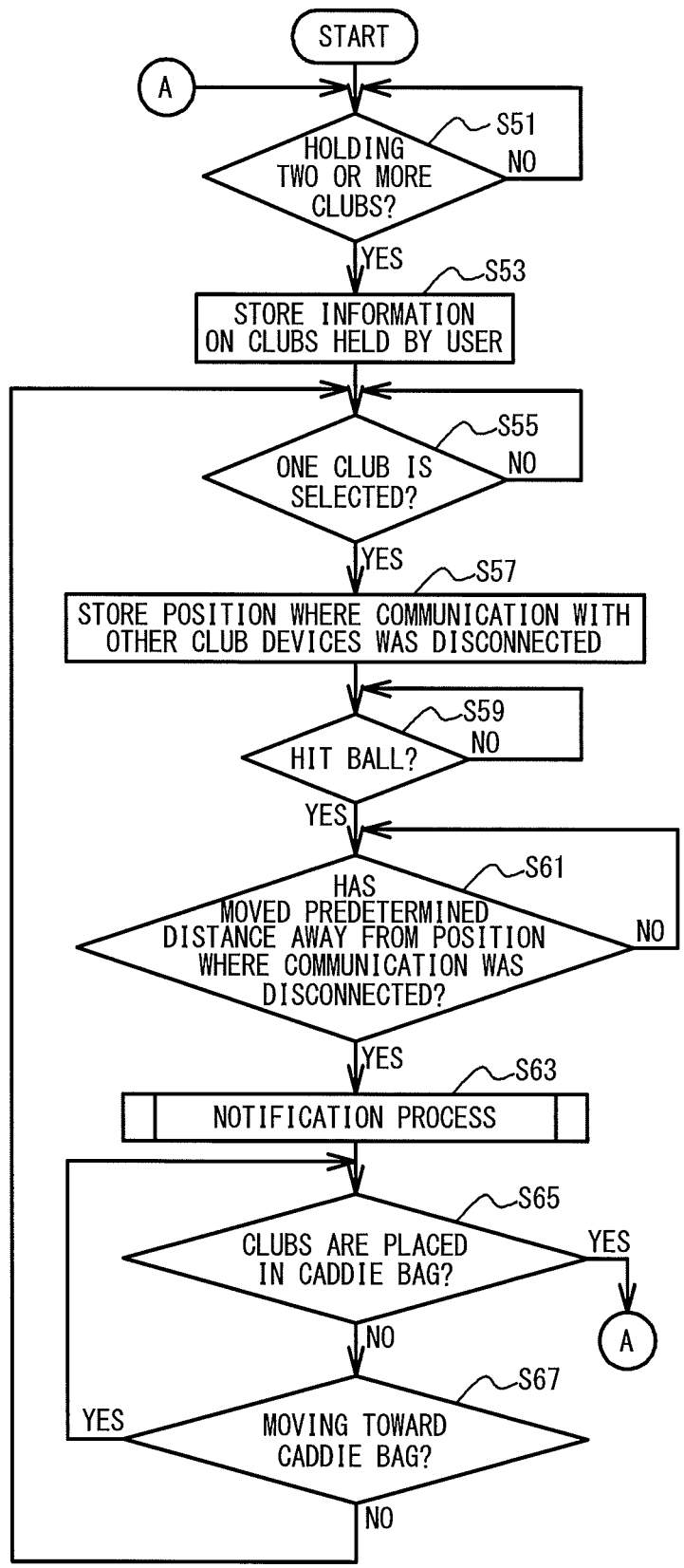
FIG. 16 is a flowchart of an exemplary process executed by a control unit of a mobile terminal in accordance with the fourth embodiment.

A description will be given of the operation of the electronic device system 500D configured as described above with use of flowcharts of FIG. 16 and FIG. 17. In the present embodiment, the process of FIG. 16 is started when the user arrives at the starting hole, i.e., when the user starts playing golf. Whether the user arrives at the starting hole can be determined based on the positional information of the user obtained from the position detecting unit 23 and information on the layout of a golf course. The information on the layout of the golf course may be stored in the storage unit 27 in advance, or may be obtained from a server or the like through the wireless communication unit 22.

In the process of FIG. 16, at step S51, the control unit 29 determines whether the user is holding two or more golf clubs 1. More specifically, the control unit 29 determines whether the communication between the mobile terminal 20 and two or more club devices 10 is established. Here, assume that the user A picks up only a number seven iron from the caddie bag 4 to hit tee shot (the first shot). In this case, the communication with only one club device 10 is established, and thus the determination at step S51 is NO. The control unit 29 repeats the determination at step S51 till the communication with two or more club devices 10 is established. After that, when the user A picks up the golf club 1A (assumed to be a sand wedge (SW)) and the golf club 1B (assumed to be a pitching wedge (PW)) from the caddie bag 4 to hit the second shot, the communication with the club devices 10A, 10B is established. That is to say, as the communication with two or more club devices 10 is established, the determination at step S51 becomes YES, and the control unit 29 proceeds to step S53.

At step S53, the control unit 29 obtains information used to identify the golf club 1 held by the user from the club device 10, and stores it in the storage unit 27. In the present embodiment, the control unit 29 obtains the owner of and the number information of the golf club 1 from the club device 10, and stores them in the storage unit 27. Since the user A is holding the golf club 1A (SW) and the golf club 1B (PW), the control unit 29 stores information on two golf clubs 1A, 1B in a club information table illustrated in FIG. 18A. The club information table includes fields of owner, number, and communication disconnected position. The field of owner stores the owner of the golf club 1, and the field of number stores the number information of the golf club 1. The field of communication disconnected position stores the position at which the communication with the club device 10 installed in the golf club 1 was disconnected (the details will be described later). The control unit 29 may store information on the manufacturer of, the name of product of, and the model number of the golf club 1 in the storage unit 27 in addition to the owner of and the number information of the golf club 1.

At subsequent step S55, the control unit 29 waits till the user selects one golf club 1 from the two or more golf clubs 1. For example, when the user A selects the golf club 1A from the golf club 1A and the golf club 1B to hit the second shot, and places the remaining golf club 1B at a position near the user A that does not disturb the shot, the determination at step S55 becomes YES, and the control unit 29 proceeds to step S57.

At step S57, the control unit 29 stores the position (such as the latitude and the longitude) at which the communication with the club device 10 installed in the golf club (the golf club 1B: PW) that was not selected at step S55 from the two or more golf clubs 1 was disconnected in the storage unit 27 (see FIG. 18B). The control unit 29 then proceeds to step S59. At this time, the time when the communication with the club device 10 was disconnected may be additionally stored.

The processes at step S59 and step S61 are processes for determining whether it has been detected when the communication between the mobile terminal 20 and the club devices 10 installed in the two or more golf clubs 1 held by the user at step S51 is to be established. At step S59, the control unit 29 determines whether the user hit a ball, i.e., whether the user used the golf club 1 selected at step S55. For example, the control unit 29 determines whether a sound collected by the microphone 31 of the shoe device 30 is a ball hitting sound based on the frequency of the collected sound to determine whether the user hit a ball. When the determination here is NO, the control unit 29 repeats the determination at step S59 till the user hits a ball. When the user A hits a ball with the golf club 1A selected at step S55, the determination at step S59 becomes YES, and the process moves to step S61.

At step S61, the control unit 29 determines whether the user has moved a predetermined distance (e.g., 5 m) away from the position where the communication with the club device 10 installed in the golf club 1 that was not selected at step S55 was disconnected. In the present embodiment, the control unit 29 determines whether the user has moved a predetermined distance away from the position where the communication with the club device 10 was disconnected based on the output from the position detecting unit 23 and the information stored at step S57. When the determination here is NO, i.e., when the user does not move, the control unit 29 does not perform (prohibits) the notification process of step S63, and repeats the determination at step S61 till the user moves a predetermined distance away from the position where the communication was disconnected. This is because the user may stay the position where the user hit a ball for some reason (for example, the user failed to hit a ball, or is waiting for the shot by another player). Thus, the user may not misplace the golf club 1, but may not collect it with intent. When the user who finished hitting a ball has moved a predetermined distance from the position where the communication was disconnected, the determination at step S61 becomes YES, and the control unit 29 starts the notification process (FIG. 17) of step S63.

(Notification Process)

Figure 17:
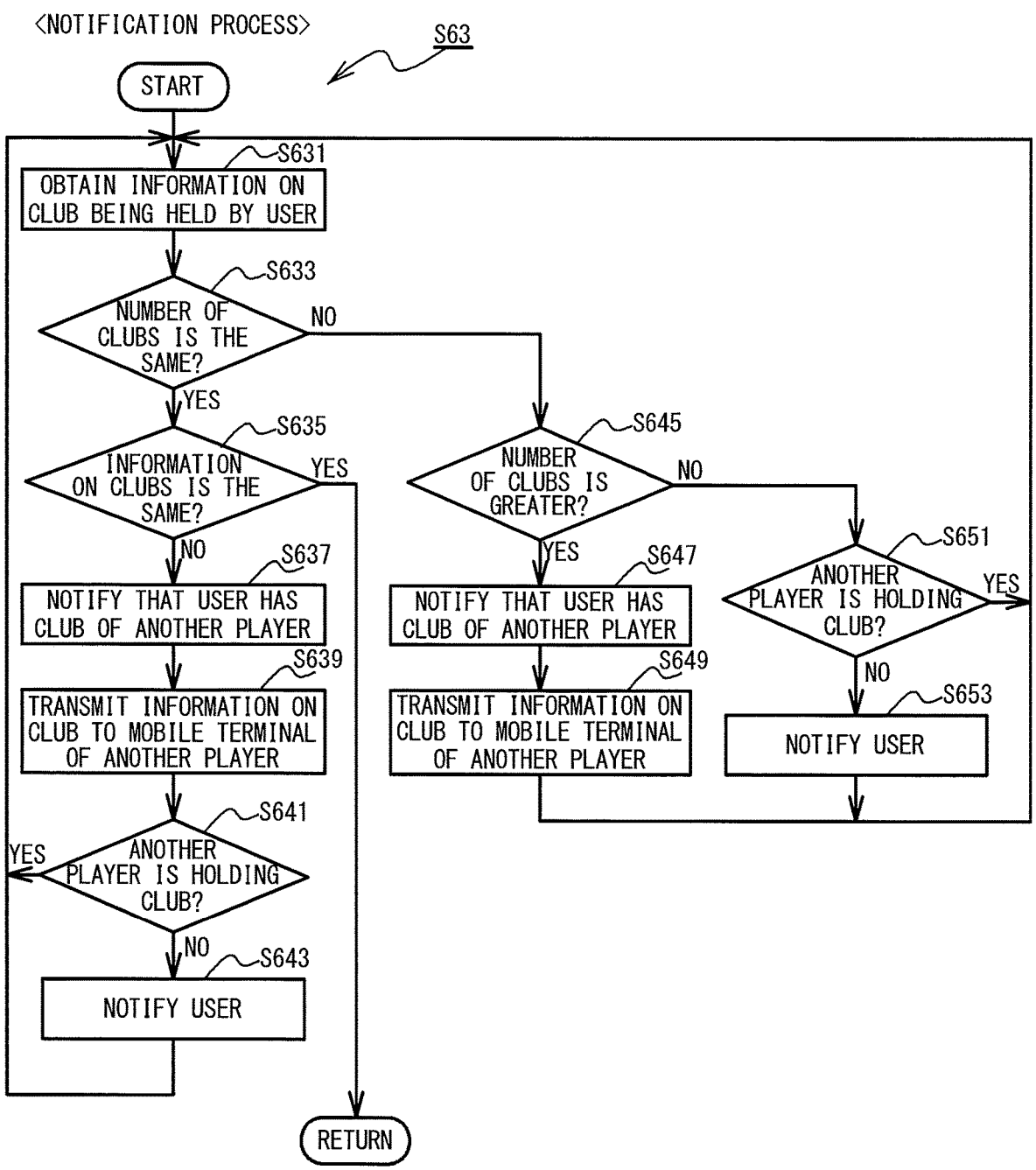
FIG. 17 is a flowchart of an exemplary notification process executed by the control unit of the mobile terminal in accordance with the fourth embodiment.

FIG. 17 is a flowchart illustrating concrete procedures of step S63. In the process of step S63 (the notification process), the control unit 29 obtains the information on the golf club 1 being currently held by the user (the owner and the number information) at step S631. The control unit 29 stores the obtained information of the golf club 1 (the owner and the number information) in a club information table for determination illustrated in FIG. 18C.

The control unit 29 then determines whether the number of the golf clubs 1 being currently held by the user (obtained at step S631) is the same as the number of the golf clubs 1 that the user used to hold (obtained at step S53 of FIG. 16) at step S633. In other words, step S633 determines whether the number of the golf clubs 1 held by the user is the same before and after the shot. More specifically, the control unit 29 determines whether the number of records in the club information table (see FIG. 18A) is the same as the number of records in the club information table for determination (see FIG. 18C). When the determination here is YES, the control unit 29 proceeds to step S635.

At step S635, the control unit 29 determines whether the information on the golf club 1 stored at step S53 of FIG. 16 (the information in the club information table) is the same as the information on the golf club 1 stored at step S631 (the information in the club information table for determination). When the determination here is NO, the control unit 29 proceeds to step S637.

When the information on the golf club 1 is not the same even when the number of the golf clubs 1 is the same before and after the shot, the user misplaces user's golf club and holds someone else's golf club. For example, assume that the user A is holding two golf clubs 1 after the shot. In FIG. 18D, the owner of the pitching wedge (PW) of the information on two golf clubs 1 stored in the club information table for determination is "the user B", and is not the same as that in the club information table. In this case, the control unit 29 notifies the user that the user is holding the golf club 1 of another player at step S637. For example, the control unit 29 outputs a sound such as "You may have a golf club of another player." from the loudspeaker 25, or displays the same message on the display unit 28 for notification. This allows the user to notice that the user is erroneously holding the golf club 1 of another player. In addition, in golf, a penalty stroke is added when a player uses a golf club of another player. Thus, avoided is a situation where the user erroneously uses a golf club of another player and a penalty stroke is thereby added to user's score.

At subsequent step S639, the control unit 29 transmits the information on the golf club 1 erroneously held by the user to the mobile terminal 20 of the player who is the owner (another player: the user B in the present embodiment). This allows the user B to know that the golf club 1 of the user B is held by the user A.

At subsequent step S641, the control unit 29 determines whether another player is holding the golf club 1 misplaced by the user, i.e., whether the misplaced golf club 1 is collected by another player. For example, the control unit 29 of the mobile terminal 20A of the user A communicates with the mobile terminal 20B of the user B who is playing golf together with the user A through the wireless communication unit 22, and inquires of the mobile terminal 20B about whether the user B is holding the golf club 1B of the user A. The mobile terminal 20B determines whether the communication with the club device 10B installed in the golf club 1B of the user A has been established to determine whether the user B is holding the golf club 1B of the user A, and transmits the determination result to the mobile terminal 20A. The mobile terminal 20A receives the determination result from the mobile terminal 20B to perform the determination at step S641. When the determination here is YES, the user does not misplace the golf club 1 in a golf course, and thus the process returns to step S631. At this time, the user may be notified that the golf club 1 is collected by another player. On the other hand, when the determination here is NO, i.e., when the misplaced golf club 1 is not collected by another player, the control unit 29 proceeds to step S643.

At step S643, the control unit 29 notifies the user. For example, the control unit 29 outputs a sound such as "You may misplace a golf club." from the loudspeaker 25, or displays the same message on the display unit 28 to alert the user. Instead of the loudspeaker 25, a vibrator not illustrated may be used to vibrate the mobile terminal 20 to alert the user. This allows the user to notice that the user misplaces the golf club 1. Additionally, the control unit 29 may display the position where the communication with the club device 10 was disconnected on the display unit 28. This allows the user to know which position the user misplaced the golf club 1 in the course, and to reduce the time taken to collect the misplaced golf club 1. After step S643, the process returns to step S631.

When the determination at step S633 is NO, i.e., when the number of the golf clubs 1 is not the same before and after the shot, the control unit 29 proceeds to step S645.

At step S645, the control unit 29 determines whether the number of the golf clubs 1 after the shot (the number of the golf clubs 1 obtained at step S631) is greater than the number of the golf clubs 1 before the shot (the number of the golf clubs 1 obtained at step S53 of FIG. 16). The positive determination here means that the user is holding a golf club of another player (e.g., the user B) in addition to user's golf clubs. For example, in FIG. 18E, the golf club 1 of the user B is registered in the club information table for determination in addition to the golf clubs 1A, 1B (SW, PW) held by the user A before the shot, and thus the number of records in the club information table for determination is greater than the number of records in the club information table. In this case, the control unit 29 proceeds to step S647 and notifies the user that the user is holding a golf club of another player. When the user is holding user's golf clubs 1 correctly although the number of the golf clubs 1 after the shot is greater than the number of the golf clubs 1 before the shot, i.e., when the club information table for determination contains all the records in the club information table (see FIG. 18E), the process may move to step S649 without notifying the user.

At subsequent step S649, the control unit 29 transmits the information on the golf club 1 erroneously held by the user to the player who is the owner thereof (another player: the user B in the present embodiment) to the mobile terminal 20, and returns to step S631.

On the other hand, when the determination at step S645 is NO, i.e., when the number of the golf clubs 1 after the shot is less than the number of the golf clubs 1 before the shot (see FIG. 18F), it can be determined that the user misplaced the golf club 1, and thus the control unit 29 proceeds to step S651.

At step S651, the control unit 29 determines whether another player is holding the golf club 1 misplaced by the user, i.e., whether the misplaced golf club 1 is collected by another player as with at step S641 described previously.

When the determination at step S651 is NO, the control unit 29 proceeds to step S653, and notifies the user as with at step S643 described previously. When the process at step S653 is ended, the control unit 29 returns to step S631.

On the other hand, when the determination at step S651 is YES, the control unit 29 skips step S653 and returns to step S631. At this time, the user may be notified that another player is holding user's golf club 1.

In consideration of the moving time of the user, and the time taken to communicate with another player, the process may return to step S631 after a predetermined time (e.g., several tens of seconds) elapses after steps S643, S649, S651, S653.

As described above, the above process is repeated till the information on the golf club 1 held by the user (the information obtained at step S631) becomes the same as the information on the golf club 1 before the shot (the information obtained at step S53 of FIG. 16). When the user receives user's golf club 1 from another player, or returns the erroneously held golf club 1 to another player, and when the information on the golf club 1 held by the user becomes the same as the information on the golf club 1 before the shot (the information obtained at step S53 of FIG. 16), the determination at step S635 becomes YES, the process of FIG. 17 ends, and the process moves to step S65 of FIG. 16.

Back to FIG. 16, at step S65, the control unit 29 determines whether the user places the golf clubs 1 in the caddie bag 4. More specifically, the control unit 29 determines whether the communication with the club device 10 installed in each of the golf clubs 1 is ended. At this time, the control unit 29 preferably checks that the position of the caddie bag 4 obtained from the position detecting unit 41 of the bag device 40 is approximately the same as the position of the user obtained from the position detecting unit 23.

The negative determination at step S65 means that the user is moving toward the caddie bag 4, or moving through the course to hit the next shot. In this case, the control unit 29 moves to step S67, and determines whether the user is moving toward the caddie bag 4. In the present embodiment, the control unit 29 determines whether the position of the user obtained from the position detecting unit 23 is getting closer to the position of the caddie bag 4 obtained from the position detecting unit 41 of the bag device 40. The control unit 29 may determine whether the user is moving toward the caddie bag 4 based on the intensity of wireless communication between the mobile terminal 20 and the bag device 40. In this case, the position detecting unit 41 of the bag device 40 may be omitted.

When the determination at step S67 is NO, i.e., when the user is not moving toward the caddie bag 4, it is determined that the user is moving through a hole for the next shot, and the process returns to step S55.

On the other hand, when the determination at step S67 is YES, i.e., when the user is moving toward the caddie bag 4, the process returns to step S65.

When the determination at step S65 is YES, i.e., when the user places the golf clubs 1 in the caddie bag 4 and the communication with the club devices 10 is ended, the control unit 29 returns to step S51.

As described above, the process of FIG. 16 is repeated till the user finishes the game, i.e., when the user finishes the finishing hole and returns to a club house.

As described in detail above, according to the fourth embodiment, the mobile terminal 20A includes: the communication unit 21 that communicates with the club device 10A installed in the golf club 1A and the club device 10B installed in the golf club 1B through intra-body communication conducted via the user A; the control unit 29 that detects when the communication between the communication unit 21 and the club device 10A and the communication between the communication unit 21 and the club device 10B are to be established; and the loudspeaker 25 and the display unit 28 that, when the control unit 29 has detected that the communication between the communication unit 21 and the club device 10A and the communication between the communication unit 21 and the club device 10B are to be established, notifies the user A whether the golf clubs 1A, 1B are misplaced based on the communication state between the communication unit 21 and the club device 10A and the communication state between the communication unit 21 and the club device 10B. Thus, the user A can be notified at a proper timing when the user A is to hold the golf clubs 1A, 1B. Therefore, the user A is prevented from misplacing one of the golf clubs 1A, 1B in a golf course.

In the fourth embodiment, the control unit 29 detects when the communication between the communication unit 21 and the club device 10A and the communication between the communication unit 21 and the club device 10B are to be established based on whether the user has moved a predetermined distance away from the position where the communication with the club device 10 was disconnected. This enables to determine the misplacement of the golf club 1 at a timing when the misplacement of the golf club 1 easily occurs, and to notify the user. Additionally, the notification process is not performed when the user does not move away from the position where the communication with the club device 10 was disconnected for some reason (e.g., the user failed to hit a ball, or waits for the shot of another player). Thus, the user is prevented from being disturbed or from disturbing another player by the sound or the vibration for the notification.

In the fourth embodiment, when the user A has used one of the golf club 1A installed with the club device 10A and the golf club 1B installed with the club device 10B, the control unit 29 detects when the communication with the club device 10A or 10B installed in the golf club 1A or 1B that was not used is to be established. Thus, the control unit 29 does not determine whether the user A misplaces the golf clubs 1A, 1B when the user A releases the hand from the golf club 1A or 1B to hit a ball, and thus enables to prevent the user A from being disturbed by the sound or the vibration for the notification. The misplacement of the golf club easily occurs after the shot, and thus the user can be notified at a timing when the misplacement of the golf club 1 easily occurs.

In the fourth embodiment, the control unit 29 notifies the user in accordance with the determination result of whether at least one of the golf club 1A and the golf club 1B is being held by the user B different from the user A. This allows the user to know whether the misplaced golf club 1 is collected by another player.

(Variation)

Figure 19:
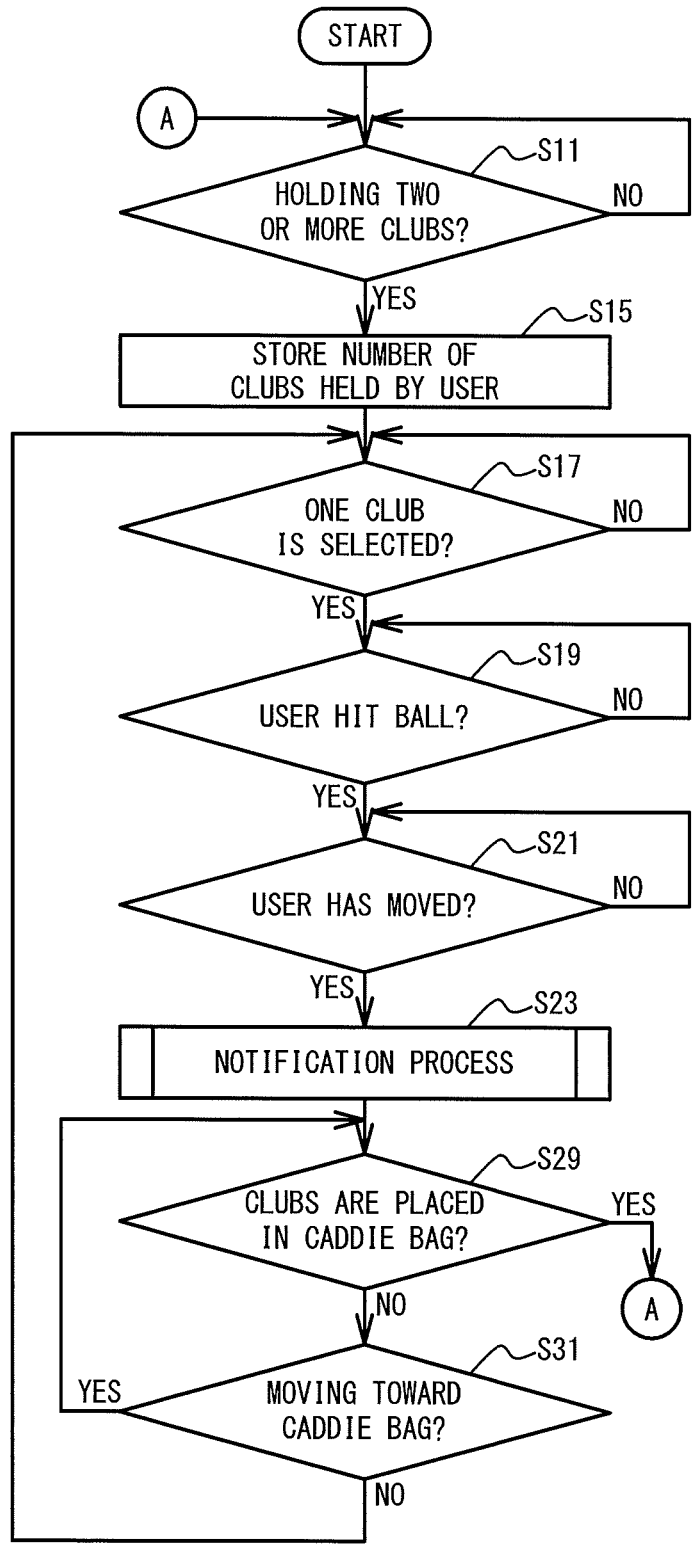
FIG. 19 is a flowchart illustrating a variation of the process executed by the control unit of the mobile terminal of the fourth embodiment.
Figure 20:
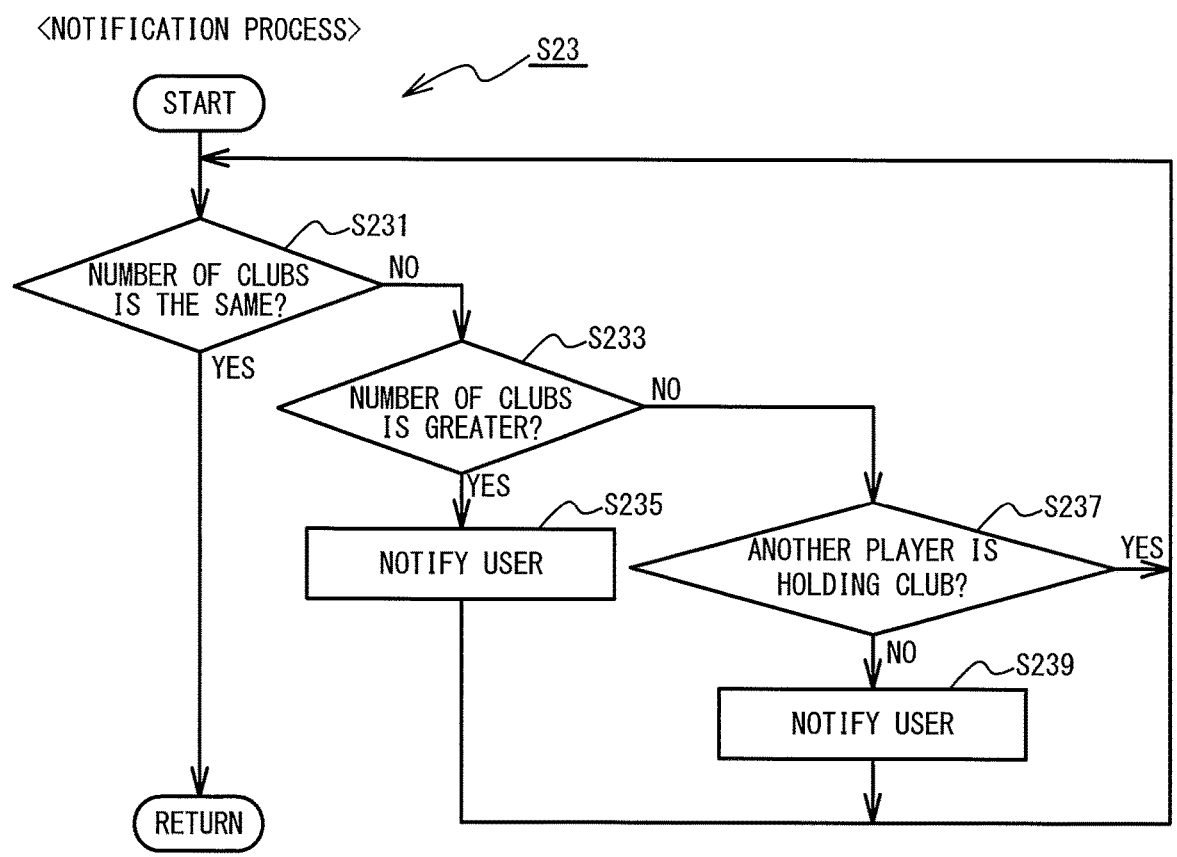
FIG. 20 is a flowchart illustrating a variation of the notification process executed by the control unit of the mobile terminal of the fourth embodiment.

In the above fourth embodiment, the control unit 29 obtains the information on the golf club 1 from the club device 10, and notifies the user based on the obtained information, but the method of notifying the user is not limited to this. For example, the control unit 29 may determine whether the golf club 1 is misplaced based on the number of the club devices 10 that communicate with the intra-body communication unit 212 (i.e., the number of the golf clubs 1 being held by the user) to notify the user. FIG. 19 and FIG. 20 are flowcharts of the process of the control unit 29 in the variation.

In the process of FIG. 19, at step S11, the control unit 29 of the mobile terminal 20 determines whether the user is holding two or more golf clubs 1 as with at step S51 described previously.

When the determination at step S11 is YES, and the process moves to step S15, the control unit 29 stores the number of the club devices 10 with which the communication has been established, i.e., the number of the golf clubs 1 that the user picked up from the caddie bag 4 in the storage unit 27. When the user A picks up the golf club 1A and the golf club 1B, the communication with the club devices 10A, 10B is established, and thus the control unit 29 stores "2 clubs" in the storage unit 27.

The control unit 29 then repeats the determination at step S17 till the user selects one golf club 1 from two or more golf clubs 1. More specifically, the control unit 29 repeats the determination at step S17 till the number of the club devices 10 with which the communication has been established becomes one. Here, when the user A selects the golf club 1A from the golf club 1A and the golf club 1B to hit the second shot, and places the remaining golf club 1B at the position near the user A that does not disturb the shot, the determination at step S17 becomes YES, and the control unit 29 proceeds to step S19.

Subsequent step S19 and step S21 are processes for detecting when the communication between the mobile terminal 20 and the club devices 10 is to be established. At step S19, the control unit 29 determines whether the user hit a ball, i.e., whether the user has used the golf club 1 selected at step S17. When the determination here is NO, the control unit 29 repeats the determination at step S19 till the user hits a ball. When the user A hits a ball with the selected golf club 1A, the determination at step S19 becomes YES, and the process proceeds to step S21.

At step S21, the control unit 29 determines whether the user A has moved. In the variation, the control unit 29 determines whether the user A has moved a predetermined distance (e.g., 5 m) based on the output from the position detecting unit 23. The movement of the user may be detected by providing at least one of an acceleration sensor and a gyro sensor to the mobile terminal 20. When the determination here is NO, i.e., when the user does not move, the control unit 29 does not execute (prohibits) the following notification process. When the user A finished the shot and has moved 5 m or greater while holding the golf club 1A but not holding the golf club 1B, i.e., while misplacing the golf club 1B, the determination at step S21 becomes YES, and the process proceeds to step S23.

At subsequent step S23, the control unit 29 starts the notification process illustrated in the flowchart of FIG. 20.

(Notification Process)

In the notification process illustrated in FIG. 20, at step S231, the control unit 29 determines whether the number of the golf clubs 1 stored at step S15 of FIG. 19 described previously is the same as the number of the golf clubs 1 held by the user after the shot. More specifically, the control unit 29 determines whether the number of the club devices 10 with which the intra-body communication has been established is the same as the number of the golf clubs 1 stored at step S15. Since the user A is holding only the golf club 1A, the number of the club devices 10 with which the intra-body communication has been established is one. In this case, it differs from "2 clubs" that is the number of the golf clubs 1 stored at step S15, and thus the determination at step S231 becomes NO, and the control unit 29 proceeds to step S233.

At step S233, the control unit 29 determines whether the number of golf clubs being currently held by the user A is greater than the number of the golf clubs 1 stored at step S15 of FIG. 19. When the determination here is YES, the user (the user A) is likely to hold the golf club 1 of another player (e.g., the user B), and thus the control unit 29 moves to step S235 and notifies the user. For example, the control unit 29 outputs a sound such as "Please check the number of golf clubs." or "You may have a golf club of another player." from the loudspeaker 25, or displays the same message on the display unit 28 to notify the user. This allows the user to notice that the user is holding a golf club of another player.

After the notification to the user at step S235, the control unit 29 returns to step S231. The control unit 29 repeats the processes and determinations at step S231, step S233, and step S235 till the user A gives a golf club to another player, i.e., till the number of the golf clubs 1 being held by the user A becomes the same as the number of the golf clubs 1 (2 clubs) stored in the storage unit 27 at step S15. When the user A gives the golf club 1 to the user B, and the golf clubs being held by the user A thereby become the golf club 1A and the golf club 1B, the determination at step S231 becomes YES, and the control unit 29 ends the process of FIG. 20 and proceeds to step S29 of FIG. 19. After the process of step S235, in consideration of the moving time of the user, the process may return to step S231 after a predetermined time (e.g., several tens of seconds) elapses.

On the other hand, when the number of golf clubs being currently held by the user A is less than the number of the golf clubs 1 stored at step S15 of FIG. 19, the determination at step S233 is NO, and the control unit 29 proceeds to step S237.

At step S237, the control unit 29 determines whether another player is holding the golf club 1 misplaced by the user. More specifically, the control unit 29 communicates with the mobile terminal 20B of the user B who is playing golf together with the user A through the wireless communication unit 22, and inquires of the mobile terminal 20B about whether the user B is holding the golf club 1 of the user A. The mobile terminal 20B determines whether the intra-body communication with the club device 10 installed in the golf club 1 of the user A has been established to determine whether the user B is holding the golf club 1 of the user A, and transmits the determination result to the mobile terminal 20A. The information of the owner stored in the storage unit 11 of the club device 10 may be used to determine whether the golf club 1 being held by the user B is the golf club 1 of the user A.

When the determination at step S237 is NO, i.e., when the golf club 1 misplaced by the user is not held by another player, the control unit 29 proceeds to step S239. Here, assume that the user B does not collect the golf club 1B misplaced by the user A.

At step S239, the control unit 29 notifies the user. For example, the control unit 29 outputs a sound such as "You may misplace a golf club." from the loudspeaker 25, or displays the same message on the display unit 28 to alert the user.

After step S239, the control unit 29 returns to step S231. When the user A goes back to pick up the golf club 1B as a result of the notification at step S239, and holds the golf club 1A and the golf club 1B, the number of the golf clubs 1 (2 clubs) stored in the storage unit 27 at step S15 of FIG. 19 becomes the same as the number of the golf clubs 1 being currently held by the user (2 clubs). Thus, the determination at step S231 becomes YES, and the control unit 29 ends the process of FIG. 20, and moves to step S29 of FIG. 19.

When the determination at step S237 is YES, i.e., when another player is holding the golf club 1 misplaced by the user, the control unit 29 determines that there is no misplaced golf club 1, and moves to step S231. At this time, the user may be notified that another player is holding user's golf club 1.

The control unit 29 repeats the processes and determinations at step S231 to step S239 till the user receives the golf club 1 from another player and holds the golf clubs 1 of the number stored at step S15. For example, when the user B collected the golf club 1B misplaced by the user A, the determination at step S231 becomes YES when the user A receives the golf club 1B from the user B and holds the golf club 1A and the golf club 1B. Then, the control unit 29 ends the process of FIG. 20, and proceeds to step S29 of FIG. 19.

At step S29, the control unit 29 determines whether the user places the golf clubs 1 in the caddie bag 4 as with at step S65 described previously.

When the determination at step S29 is NO, the control unit 29 moves to step S31 and determines whether the user is moving toward the caddie bag 4 as with at step S67 described previously. When the determination at step S31 is NO, the process returns to step S17. When the determination is YES, the process returns to step S29. The control unit 29 may perform the determination at step S29 after a predetermined time (e.g., several tens of seconds) elapses after the notification process in consideration of the moving time of the user.

On the other hand, when the determination at step S29 is YES, the control unit 29 returns to step S11. As described above, the process of FIG. 19 is repeated till the user finishes playing all holes.

As described above, the variation can be also used to notify the user of the misplacement of the golf club 1 as with the above fourth embodiment.

In the variation, the control unit 29 does not determine whether the user misplaces the golf club 1 or does not notify the user when the user is not moving. Thus, the user is prevented from being disturbed by the sound or the vibration for the notification when the user does not move because the user failed to hit a ball.

In the above fourth embodiment and the variation thereof, the positional information of the user and the moving information of the user are detected by the single position detecting unit 23. Thus, the configuration of the mobile terminal 20 can be simplified.

In the above embodiments and the variation, when the user moves by a cart while holding the golf clubs 1, step S55 of FIG. 16 and the determination at step S17 of FIG. 19 are repeated. In this case, the control unit 29 may terminate the processes of FIG. 16 and FIG. 19. More specifically, for example, when the user A and the caddie bag 4 are moving together while the intra-body communication with the club devices 10A, 10B installed in the golf clubs 1A, 1B is established, the control unit 29 terminates the processes of FIG. 16 and FIG. 19. Then, when the user is a predetermined distance away from the caddie bag 4, the process may be resumed from step S51 or S11. It is possible to determine whether the user A and the caddie bag 4 are moving together based on the output of the position detecting unit 41 of the bag device 40 and the position detecting unit 23 of the mobile terminal 20A.

In the above fourth embodiment, the control unit 29 determines whether the user hit a golf ball with use of the acoustic data of sounds collected by the microphone 31 of the shoe device 30, but may perform the determination with use of the acoustic data of sounds collected by the microphone 24 of the mobile terminal 20. In this case, the shoe device 30 can be omitted from the electronic device system 500D. Alternatively, a microphone may be provided in the clubhead of the golf club 1 to determine whether the user hit a ball with use of the acoustic data of sounds collected by the microphone, for example. Alternatively, a pressure sensor may be provided in the clubhead of the golf club 1, and it may be determined whether the user hit a ball based on the output from the pressure sensor (for example, based on whether the output of the pressure sensor exceeds a threshold value).

In the above fourth embodiment, the information on the layout of a golf course may be stored in the storage unit 27 to be compared with the output of the position detecting unit 23 to notify the user which hole and where the user is. When the storage unit 27 stores the position where the communication with the club device 10 installed in the golf club 1 was disconnected (see FIG. 18B), the positional relation between the current position of the user and the misplaced golf club 1 may be notified.

In the above fourth embodiment, the control unit 29 may receive the output of the position detecting unit 41 of the bag device 40 from the bag device 40, and may notify the user where the caddie bag 4 is in a hole based on the information on the layout of a golf course stored in the storage unit 27.

The above fourth embodiment uses a mobile terminal (a smartphone) having a telephone function and the size of one hand as an example, but may be applied to a mobile terminal such as a tablet-type computer.

The above fourth embodiment describes golf as an example, but the present invention may be applied to sports other than golf.

While the exemplary embodiments of the present invention have been illustrated in detail, the present invention is not limited to the above-mentioned embodiments, and other embodiments, variations and modifications may be made without departing from the scope of the present invention.

What is claimed is:

1. A method implemented by a processor of an electronic device, the method comprising:
   pairing a portable device with the electronic device;
   storing a detected position of the electronic device in accordance with a result of near field communication between the electronic device and the portable device paired with the electronic device;
   when near field communication between the electronic device and another portable device, which is not paired with the electronic device, is established, obtaining information about the another portable device from the another portable device; and
   providing another electronic device used by a person, who is different from a user of the e ectronic device, with the obtained information about the another portable device.

2. The method of claim 1, further comprising:
   providing information on a first detected position, corresponding to disconnection of the near field communication between the electronic device and the portable device paired with the electronic device, of the electronic device, and wherein the providing of the information on the first detected position includes displaying the first detected position on a map.

3. The method of claim 1, further comprising:
   when the portable device is outside of a communication range of the electronic device and is then inside of the communication range of the electronic device, outputting a notification pertaining to the portable device.

4. The method of claim 1, further comprising:
   when the near field communication between the electronic device and the portable device is re-established after the near field communication between the electronic device and the portable device is disconnected, outputting a notification pertaining to the portable device.

5. The method of claim 1, further comprising:
   causing a sound to be output when the electronic device is communicating with the portable device.

6. The method of claim 1, wherein
   the pairing of the portable device with the electronic device includes pairing the portable device with the electronic device through the near field communication.

7. The method of claim 1, wherein the detected position of the electronic device includes geographical information or facility information.

8. The method of claim 1, further comprising:
   providing information on a first detected position, corresponding to disconnection of the near field communication. between the electronic device and the portable device paired with the electronic device, of the electronic device, and wherein the providing of the information on the first detected position includes outputting the information on the first detected position by at least one of: a sound, a vibration, and a displayed image.

9. The method of claim 1, wherein the portable device is installed in an article.

10. The method of claim 1, wherein the portable device is configured to attach to an article.

11. An electronic device comprising:
   a communication interface configured to communicate with a portable device; and
   a processor configured to:
      pair the portable device with the electronic device;
      store a detected position of the electronic device in accordance with a result of near field communication between the electronic device and the portable device paired with the electronic device;
      when near field communication between the electronic device and another portable device, which is not paired with the electronic device, is established, obtain information about the another portable device from the another portable device; and
      provide another electronic device used by a person, who is different from a user of the electronic device, with the obtained information about the another portable device.

12. The electronic device of claim 11, wherein
   the processor is further configured to provide information on a first detected position, corresponding to disconnection of the near field communication between the electronic devicc and the portable device paired with the electronic device. of the electronic device. and
   the processor provides the information on the first detected position by displaying the first detected position on a map.

13. The electronic device of claim 11, wherein the processor is further configured to:
   when the near field communication between the electronic device and the portable device paired with the electronic device is re-established after the near field communication between the electronic device and the portable device paired with the electronic device is disconnected, output a notification pertaining to the portable device.

14. The electronic device of claim 11, wherein the processor is further configured to:
when the portable device is outside of a communication range of the electronic device and is then inside of the communication range of the electronic device, output a notification pertaining to the portable device paired with the electronic device.

15. The electronic device of claim 11, wherein the processor is further configured to:
cause a sound to be output when the electronic device is communicating with the portable device paired with the electronic device.

16. The electronic device of claim 11, wherein the processor is further configured to:
pair the portable device with the electronic device through the near field communication.

17. A method implemented by a processor of an electronic device, the method comprising:
paring a portable device with the electronic device;
when near field communication between the electronic device and another portable device, which is not paired with the electronic device, is established, obtaining information about the another portable device from the another portable device; and
providing another electronic device used by a person, who is different from a user of the electronic device, with the obtained information about the another portable device.

* * * * *